(12) United States Patent
Okuno et al.

(10) Patent No.: US 11,083,200 B2
(45) Date of Patent: Aug. 10, 2021

(54) PLANT PROTECTION AGENT

(71) Applicant: FUJIFILM Business Innovation Corp., Tokyo (JP)

(72) Inventors: Hiroyoshi Okuno, Kanagawa (JP);
Hideaki Yoshikawa, Kanagawa (JP);
Takeshi Iwanaga, Kanagawa (JP);
Sakae Takeuchi, Kanagawa (JP); Yuka Zenitani, Kanagawa (JP); Yasuhiro Kusumoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/255,847

(22) Filed: Jan. 24, 2019

(65) Prior Publication Data
US 2020/0085060 A1 Mar. 19, 2020

(30) Foreign Application Priority Data

Sep. 14, 2018 (JP) .............................. JP2018-172939

(51) Int. Cl.
*A01N 55/02* (2006.01)
*B01J 21/08* (2006.01)
*B01J 21/06* (2006.01)
*B01J 31/02* (2006.01)
*B01J 35/00* (2006.01)
*B01J 31/38* (2006.01)
*B01J 35/02* (2006.01)

(52) U.S. Cl.
CPC ............ *A01N 55/02* (2013.01); *B01J 21/063* (2013.01); *B01J 21/08* (2013.01); *B01J 31/0274* (2013.01); *B01J 31/0275* (2013.01); *B01J 31/38* (2013.01); *B01J 35/004* (2013.01); *B01J 35/0013* (2013.01); *B01J 35/026* (2013.01)

(58) Field of Classification Search
CPC ........ B01J 21/063; B01J 21/08; B01J 35/004; B01J 35/026; A01N 55/02
See application file for complete search history.

(56) References Cited

U.S. PATENT DOCUMENTS

| | | | |
|---|---|---|---|
| 6,589,912 B2 | 7/2003 | Kawai | |
| 8,609,121 B2 | 12/2013 | Averett et al. | |
| 9,055,751 B2 | 6/2015 | Averett et al. | |
| 9,144,242 B2 | 9/2015 | Averett et al. | |
| 9,392,795 B2 | 7/2016 | Averett et al. | |
| 9,402,400 B2 | 8/2016 | Averett et al. | |
| 9,833,003 B2 | 12/2017 | Averett et al. | |
| 2008/0050440 A1 | 2/2008 | Wakamura et al. | |
| 2009/0263502 A1 | 10/2009 | Shiki | |
| 2011/0111957 A1* | 5/2011 | Ishaque | A01N 25/22 504/103 |
| 2012/0225770 A1* | 9/2012 | Tamaoka | C09D 5/1618 502/1 |
| 2018/0161763 A1* | 6/2018 | Iwanaga | B01J 21/18 |

FOREIGN PATENT DOCUMENTS

| | | |
|---|---|---|
| JP | H11343209 | 12/1999 |
| JP | 3458948 | 10/2003 |
| JP | 3678606 | 8/2005 |
| JP | 2005255558 | 9/2005 |
| JP | 2008050348 | 3/2008 |
| JP | 2008150351 | 7/2008 |
| JP | 4321865 | 8/2009 |
| JP | 4531732 | 8/2010 |
| JP | 4619724 | 1/2011 |
| JP | 2014001147 | 1/2014 |
| JP | 6066998 | 1/2017 |

* cited by examiner

*Primary Examiner* — Johann R Richter
*Assistant Examiner* — Danielle Sullivan
(74) *Attorney, Agent, or Firm* — JCIPRNET

(57) ABSTRACT

A plant protection agent includes a photocatalyst particle containing a titanium oxide compound. The surface of the photocatalyst particle is modified with a metal compound that includes a metal atom and a hydrocarbon group. The photocatalyst particle has absorption at a wavelength of 550 nm.

8 Claims, 2 Drawing Sheets

PLANT PROTECTION AGENT

CROSS-REFERENCE TO RELATED APPLICATIONS

This application is based on and claims priority under 35 USC 119 from Japanese Patent Application No. 2018-172939 filed Sep. 14, 2018.

BACKGROUND

(i) Technical Field

The present disclosure relates to a plant protection agent.

(ii) Related Art

Greenhouse cultivation may be used for preventing plants from being exposed to excessively high levels of ultraviolet radiation because such ultraviolet radiation may induce malformations in plants and variations in the color of plants. Greenhouse cultivation is used also for, for example, preventing cold-temperature damage to plants, controlling harvest time, and preventing cross breeding. Consequently, some plants are cultivated in an environment where the levels of ultraviolet radiation are low.

Compositions that include photocatalyst particles as an active ingredient are known as a plant protection agent, a disease control agent, and an agricultural chemical (see, e.g., Japanese Laid Opened Patent Application Publication Nos. 11-343209, 2005-255558, 2008-150351, 2014-1147, and 2008-50348 and Japanese Patent Nos. 3458948, 4321865, 6066998, 3678606, 4619724, and 4531732). Such plant protection agents and the like reduce diseases of plants by using the photocatalytic reaction produced by the photocatalyst particles.

SUMMARY

However, the above plant protection agents, disease control agents, and agricultural chemicals of the related art, which include photocatalyst particles as an active ingredient, may fail to produce the photocatalytic reaction and fail to reduce diseases of plants to a sufficient degree when they are used for greenhouse cultivation, because the active ingredient, that is, the photocatalyst particles, are responsive to ultraviolet radiation.

Aspects of non-limiting embodiments of the present disclosure relate to a plant protection agent that may reduce diseases of plants by using the photocatalytic reaction produced by green-light responsive photocatalyst particles.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a plant protection agent including a photocatalyst particle containing a titanium oxide compound. A surface of the photocatalyst particle is modified with a metal compound that includes a metal atom and a hydrocarbon group. The photocatalyst particle has absorption at a wavelength of 550 nm.

BRIEF DESCRIPTION OF THE DRAWINGS

An exemplary embodiment of the present disclosure will be described in detail based on the following figures, wherein.

DETAILED DESCRIPTION

Figure 1:
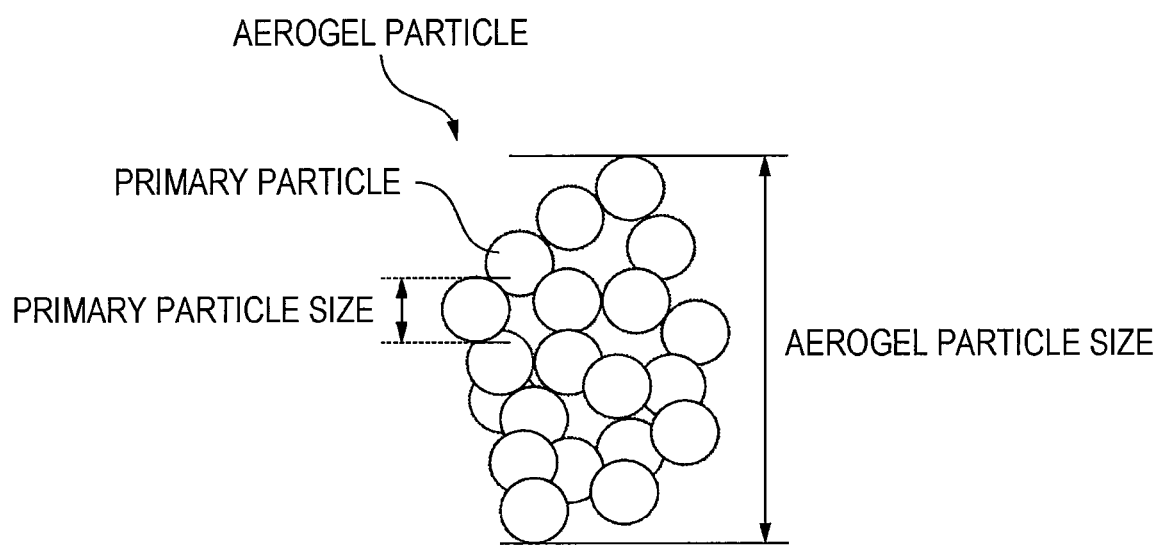
FIG. 1 is a schematic diagram illustrating an example of an aerogel particle.

An exemplary embodiment of the present disclosure is described below. The following description and examples are merely illustrative and do not limit the range of the exemplary embodiment.

In the present disclosure, a numerical range expressed using "to" means the range specified by the minimum and maximum described before and after "to", respectively.

In the present disclosure, when a numeral ranges are described in a stepwise manner, the upper or lower limit of a numerical range may be replaced with the upper or lower limit of another numerical range, respectively. In the present disclosure, the upper and lower limits of a numerical range may be replaced with the upper and lower limits described in Examples.

The term "step" used herein refers not only to an individual step but also to a step that is not distinguishable from other steps but achieves the intended purpose of the step.

The components described in the present disclosure may include plural types of relevant substances. In the present disclosure, in the case where a composition includes plural substances that correspond to a component of the composition, the content of the component in the composition is the total content of the plural substances in the composition unless otherwise specified.

Plant Protection Agent

Chlorophyll, which is a pigment responsible for plant photosynthesis, has an absorption peak at around 450 nm (blue light) and around 660 nm (red light).

Phytochrome, which is a pigment responsible for plant morphogenesis, is activated by red light with a wavelength of around 660 nm and deactivated by far-red light with a wavelength of around 730 nm.

Plants suitably absorb blue and red light, while suitably reflecting green light.

The plant protection agent according to this exemplary embodiment is devised on the basis of the above-described photoresponsivity of plants.

The plant protection agent according to this exemplary embodiment is a plant protection agent that includes photocatalyst particles. Specifically, the plant protection agent according to this exemplary embodiment includes photocatalyst particles containing a titanium oxide compound. The surfaces of the photocatalyst particles are modified with a metal compound that includes a metal atom and a hydrocarbon group. The photocatalyst particles have absorption at a wavelength of 550 nm. The plant protection agent according to this exemplary embodiment may reduce diseases of plants by using the photocatalytic reaction produced by the photocatalyst particles. This is presumably because the active oxygen generated upon the photocatalyst being excited by light suppresses pathogen proliferation and decomposes toxic substances.

The plant protection agent according to this exemplary embodiment includes photocatalyst particles having absorption at a wavelength of 550 nm. Since the photocatalyst particles produce a photocatalytic reaction upon receiving light having a wavelength of 550 nm, that is, green light reflected by plant bodies, the photocatalyst particles may efficiently reduce diseases of the plants on the surfaces of the plant bodies. The photocatalyst particles may produce the photocatalytic reaction to reduce plant diseases regardless of whether the photocatalyst particles are used for open-field cultivation or for greenhouse cultivation.

The surfaces of the photocatalyst particles having absorption at a wavelength of 550 nm, which are included in the plant protection agent according to this exemplary embodiment, are modified with a metal compound that includes a metal atom and a hydrocarbon group. The metal compound that includes a metal atom and a hydrocarbon group is bonded to the surfaces of the photocatalyst particles, and the hydrocarbon group provides adhesion of the photocatalyst particles to plant bodies. Therefore, the photocatalyst particles are likely to remain on plant bodies to produce the photocatalytic reaction on the plant bodies.

The plant protection agent according to this exemplary embodiment may include, for example, the photocatalyst particles and an aqueous medium. In such a case, the photocatalyst particles are dispersed in the aqueous medium.

In the plant protection agent according to this exemplary embodiment, the photocatalyst particles may have a volume-average size of 0.5 μm or more and 50 μm or less.

The photocatalyst particles are likely to damage not only pathogens but also plant bodies. The photocatalyst particles are less likely to remain adhered on plant bodies to damage the plants when the volume-average size of the photocatalyst particles is 0.5 μm or more than when the volume-average size of the photocatalyst particles is less than 0.5 μm. For the above reason, the volume-average size of the photocatalyst particles is preferably 0.5 μm or more, is more preferably 0.8 μm or more, and is further preferably 1 μm or more.

The photocatalyst particles are more likely to adhere to plant bodies and reduce diseases of the plants with higher certainty when the volume-average size of the photocatalyst particles is 50 μm or less than when the volume-average size of the photocatalyst particles is more than 50 μm. For the above reason, the volume-average size of the photocatalyst particles is preferably 50 μm or less, is more preferably 30 μm or less, and is further preferably 20 μm or less.

The volume-average size of the photocatalyst particles is determined by the following method.

A dispersion liquid that includes photocatalyst particles dispersed therein is passed through a sieve having an opening of 106 μm in order to remove coarse particles from the dispersion liquid. The sizes of the particles included in the dispersion liquid are measured with a laser-diffraction particle sizing analyzer "LS 13 320" produced by Beckman Coulter, Inc. Then, a volume-based particle size distribution is determined. The particle size D50v at which the cumulative volume of smaller particles reaches 50% of the total volume of the particles is determined. The particle size D50v is considered as the volume-average size (μm) of the photocatalyst particles.

The photocatalyst particles included in the plant protection agent according to this exemplary embodiment may be formed by aggregation of primary particles having an average size of 1 nm or more and 200 nm or less.

The photocatalyst particles have a higher photocatalytic activity when the average size of the primary particles is 200 nm or less than when the average size of the primary particles is more than 200 nm. For the above reason, it is preferable that the photocatalyst particles be formed by aggregation of primary particles having an average size of 200 nm or less. The average size of the primary particles is more preferably 150 nm or less and is further preferably 100 nm or less.

In order to make it easy to produce the primary particles and the aggregated particles and enhance the dispersion stability of the primary particles and the aggregated particles, the average size of the primary particles is preferably 1 nm or more, is more preferably 5 nm or more, and is further preferably 10 nm or more.

The average size of the primary particles is determined by the following method.

An image of the photocatalyst particles is taken with a scanning electron microscope "S-4100" produced by Hitachi, Ltd. The image is captured into an image processor "LUZEXIII" produced by NIRECO CORPORATION. The area of each particle is measured by image analysis, and the equivalent circle diameter (nm) of the particle is calculated from the area of the particle. The arithmetic average of the equivalent circle diameters of 100 primary particles is calculated and considered as the average size of the primary particles.

The photocatalyst particles having absorption at a wavelength of 550 nm, which are included in the plant protection agent according to this exemplary embodiment, are described below in detail. Hereinafter, the photocatalyst particles having absorption at a wavelength of 550 nm may be referred to as "green-light responsive photocatalyst particles".

Photocatalyst Particles Having Absorption at Wavelength of 550 nm (Green-Light Responsive Photocatalyst Particles)

The green-light responsive photocatalyst particles are photocatalyst particles produced by modifying the surfaces of particles that contain a titanium oxide compound (hereinafter, such particles are referred to as "titanium oxide compound-containing particles"). The titanium oxide compound-containing particles may be, for example, at least one type of particles selected from the group consisting of titanium dioxide particles, metatitanic acid particles, titanium dioxide aerogel particles, and silica-titania composite aerogel particles.

The green-light responsive photocatalyst particles may be, for example, photocatalyst particles that are produced by modifying the surfaces of ultraviolet radiation-absorbable titanium oxide compound-containing particles having an ultraviolet radiation-responsive photocatalytic activity and thereby become capable of absorbing light with a wavelength of 550 nm.

The green-light responsive photocatalyst particles may be capable of absorbing ultraviolet radiation. That is, the green-light responsive photocatalyst particles may have an ultraviolet-radiation responsive photocatalytic activity in addition to the green-light responsive photocatalytic activity. The absorbance of the green-light responsive photocatalyst particles at a wavelength of 550 nm may be, for example, 0.02 or more with the absorbance of the photocatalyst particles at a wavelength of 350 nm being 1. The absorbance of the green-light responsive photocatalyst particles at a wavelength of 550 nm may be, for example, 0.1 or more with the absorbance of the photocatalyst particles at a wavelength of 350 nm being 1. The absorbance of the green-light responsive photocatalyst particles at a wavelength of 550 nm may be, for example, 0.2 or more with the absorbance of the photocatalyst particles at a wavelength of 350 nm being 1.

The green-light responsive photocatalyst particles may have absorption over the entire wavelength range of 500 nm or more and 600 nm or less. Since such photocatalyst particles have absorption over the entire wavelength range in which light is reflected by plant bodies at high reflectivity, the photocatalyst particles produce a photocatalytic reaction even in low light and may reduce diseases of plants even in low light. The green-light responsive photocatalyst particles may have, for example, an absorbance of 0.02 or more at wavelengths of 550 and 600 nm, with the absorbance of the photocatalyst particles at a wavelength of 350 nm being 1. The green-light responsive photocatalyst particles may have, for example, an absorbance of 0.1 or more at a wavelength of 550 nm and an absorbance of 0.05 or more at a wavelength of 600 nm, with the absorbance of the photocatalyst particles at a wavelength of 350 nm being 1. The green-light responsive photocatalyst particles may have, for example, an absorbance of 0.2 or more at a wavelength of 550 nm and an absorbance of 0.1 or more at a wavelength of 600 nm, with the absorbance of the photocatalyst particles at a wavelength of 350 nm being 1.

The green-light responsive photocatalyst particles may have a capability to absorb visible light, with which the photocatalyst particles are capable of absorbing visible light other than green light. That is, the green-light responsive photocatalyst particles may have a visible-light responsive photocatalytic activity other than the green-light responsive photocatalytic activity. The green-light responsive photocatalyst particles may have, for example, absorption over the entire wavelength range of 400 nm or more and 800 nm or less.

The ratio of the absorbance of the green-light responsive photocatalyst particles at a wavelength of 650 nm to the absorbance of the green-light responsive photocatalyst particles at a wavelength of 550 nm (hereinafter, this ratio is referred to as "absorbance ratio 650 nm/550 nm") may be less than 1. In the present disclosure, a wavelength of 650 nm is taken as the typical wavelength of red light.

The absorbance ratio 650 nm/550 nm being less than 1 means that red light is absorbed by the green-light responsive photocatalyst particles with a smaller absorbance than green light. Photocatalyst particles by which red light is absorbed with a smaller absorbance than green light are less likely to inhibit photosynthesis and morphogenesis of plants. For the above reason, in the green-light responsive photocatalyst particles, the absorbance ratio 650 nm/550 nm is preferably less than 1, is more preferably 0.7 or less, and is further preferably 0.4 or less.

The absorbance ratio 650 nm/550 nm of photocatalyst particles that are titanium oxide compound-containing particles which have become responsive to visible light as a result of the surfaces of the titanium oxide compound-containing particles being modified is commonly more than 0 and may be 0.02 or more.

The ratio of the absorbance of the green-light responsive photocatalyst particles at a wavelength of 750 nm to the absorbance of the green-light responsive photocatalyst particles at a wavelength of 550 nm (hereinafter, this ratio is referred to as "absorbance ratio 750 nm/550 nm") may be less than 0.6. In the present disclosure, a wavelength of 750 nm is taken as the typical wavelength of far-red light.

The absorbance ratio 750 nm/550 nm being less than 0.6 means that far-red light is absorbed by the green-light responsive photocatalyst particles with a smaller absorbance than green light. Photocatalyst particles by which far-red light is absorbed with a smaller absorbance than green light are less likely to inhibit morphogenesis of plants. For the above reason, in the green-light responsive photocatalyst particles, the absorbance ratio 750 nm/550 nm is preferably less than 0.6, is more preferably 0.4 or less, and is further preferably 0.2 or less.

The absorbance ratio 750 nm/550 nm of photocatalyst particles that are titanium oxide compound-containing particles which have become responsive to visible light as a result of the surfaces of the titanium oxide compound-containing particles being modified is commonly more than 0 and may be 0.01 or more.

The ratio of the absorbance of the green-light responsive photocatalyst particles at a wavelength of 550 nm to the absorbance of the green-light responsive photocatalyst particles at a wavelength of 450 nm (hereinafter, this ratio is referred to as "absorbance ratio 550 nm/450 nm") may be 0.1 or more. In the present disclosure, a wavelength of 450 nm is taken as the typical wavelength of blue light.

The titanium oxide compound-containing particles commonly have a capability to absorb ultraviolet radiation. Photocatalyst particles that are titanium oxide compound-containing particles which have become responsive to visible light as a result of the surfaces of the titanium oxide compound-containing particles being modified absorb blue light, which has a wavelength relatively close to that of ultraviolet radiation among visible lights, with a relatively high absorbance. The absorbance ratio 550 nm/450 nm being 0.1 or more means that the surfaces of the titanium oxide compound-containing particles have been modified to a level high enough for the titanium oxide compound-containing particles to serve as green-light responsive photocatalyst particles. When the absorbance ratio 550 nm/450 nm of the photocatalyst particles is 0.1 or more, the absorbance of blue light by the photocatalyst particles does not become excessively higher than the absorbance of green light and the photocatalyst particles do not inhibit plant photosynthesis at a significant level. For the above reason, the absorbance ratio 550 nm/450 nm of the green-light responsive photocatalyst particles is preferably 0.1 or more, is more preferably 0.2 or more, is further preferably 0.3 or more, and is most preferably 0.4 or more.

The absorbance ratio 550 nm/450 nm of photocatalyst particles that are titanium oxide compound-containing particles which have become responsive to visible light as a result of the surfaces of the titanium oxide compound-containing particles being modified is commonly less than 1 and may be 0.8 or less.

In the present disclosure, the absorbances at the specific wavelengths are theoretically derived from a diffuse reflectance spectrum by Kubelka-Munk transformation.

Particles Containing Titanium Oxide Compound

The green-light responsive photocatalyst particles include titanium oxide compound-containing particles the surfaces of which have been modified with a metal compound that includes a metal atom and a hydrocarbon group (hereinafter, such a metal compound is referred to as "organometallic compound"). The surfaces of the titanium oxide compound-containing particles may be modified with a chemical substance other than the organometallic compound before being modified with the organometallic compound. However, it is suitable that the surfaces of the titanium oxide compound-containing particles be not modified with such a chemical substance before being modified with the organometallic compound.

Examples of the titanium oxide compound-containing particles, the surfaces of which are to be modified with the organometallic compound, include titanium dioxide particles, metatitanic acid particles, titanium dioxide aerogel particles, and silica-titania composite aerogel particles. The titanium dioxide particles, metatitanic acid particles, titanium dioxide aerogel particles, and silica-titania composite aerogel particles, the surfaces of which are to be modified with the organometallic compound, are described below.

Titanium Dioxide Particles

The titanium dioxide particles may be either amorphous or crystalline. Using crystalline titanium dioxide particles may enhance the photocatalytic activity of the photocatalyst particles. In the case where the titanium dioxide particles are crystalline, the crystal structure of the titanium dioxide particles may be either a brookite, anatase, or rutile single-crystal structure or a mixed-crystal structure in which the above crystals coexist. Using titanium dioxide particles having an anatase crystal structure may enhance the photocatalytic activity of the photocatalyst particles.

Examples of the method for producing the titanium dioxide particles include, but are not limited to, a chlorine method (gas-phase method), a sulfuric acid method (liquid-phase method), a sol-gel process in which a titanium alkoxide is used, and a method in which metatitanic acid is baked.

An example of the chlorine method (gas-phase method) is described below. Rutile ores are reacted with coke and chlorine to produce gaseous titanium tetrachloride, which is subsequently cooled to form liquid titanium tetrachloride. After the liquid titanium tetrachloride has been reacted with oxygen at a high temperature, a chlorine gas is separated from titanium dioxide. Hereby, titanium dioxide particles are prepared.

An example of the sulfuric acid method (liquid-phase method) is described below. Ilmenite ores ($FeTiO_3$) or titanium slag is dissolved in concentrated sulfuric acid. Iron, which is an impurity, is separated in the form of iron sulfate ($FeSO_4$). Hereby, titanium oxysulfate ($TiOSO_4$) is prepared. The titanium oxysulfate is hydrolyzed to precipitate as titanium oxyhydroxide ($TiO(OH)_2$). The precipitate is washed and dried, and the dried substance is baked to produce titanium dioxide particles.

Titanium dioxide has an amorphous crystal structure, a brookite crystal structure, an anatase crystal structure, and a rutile crystal structure with an increase in the baking temperature. That is, by adjusting the baking temperature, titanium dioxide particles having an intended crystal structure can be prepared. The baking temperature is preferably set to 200° C. or more and 800° C. or less and is more preferably set to 400° C. or more and 600° C. or less in order to produce crystalline titanium dioxide particles.

The average primary particle size of the titanium dioxide particles is preferably 1 nm or more and 200 nm or less, is more preferably 5 nm or more and 150 nm or less, and is further preferably 10 nm or more and 100 nm or less. The average primary particle size of the titanium dioxide particles is the arithmetic average of the equivalent circle diameters of 100 primary particles which is determined by the image analysis described above.

Metatitanic Acid Particles

The term "metatitanic acid particles" used herein refers to particles of titanium acid that is a titanate hydrate represented by $TiO_2 \cdot nH_2O$ with n being 1.

Examples of the method for producing the metatitanic acid particles include, but are not limited to, a chlorine method (gas-phase method) and a sulfuric acid method (liquid-phase method).

An example of the chlorine method (gas-phase method) is described below. Rutile ores are reacted with coke and chlorine to produce gaseous titanium tetrachloride, which is subsequently cooled to form liquid titanium tetrachloride. The liquid titanium tetrachloride is dissolved in water. A strong base is charged into the resulting aqueous solution in order to hydrolyze titanium tetrachloride and precipitate titanium oxyhydroxide ($TiO(OH)_2$). The precipitate is washed and dried. Hereby, metatitanic acid particles are prepared.

An example of the sulfuric acid method (liquid-phase method) is described below. Ilmenite ores ($FeTiO_3$) or titanium slag is dissolved in concentrated sulfuric acid. Iron, which is an impurity, is separated in the form of iron sulfate ($FeSO_4$). Hereby, titanium oxysulfate ($TiOSO_4$) is prepared. The titanium oxysulfate is hydrolyzed in order to precipitate titanium oxyhydroxide ($TiO(OH)_2$). The precipitate is washed and dried to produce metatitanic acid particles.

The average primary particle size of the metatitanic acid particles is preferably 1 nm or more and 200 nm or less, is more preferably 5 nm or more and 150 nm or less, is further preferably 10 nm or more and 100 nm or less. The average primary particle size of the metatitanic acid particles is the arithmetic average of the equivalent circle diameters of 100 primary particles which is determined by the image analysis described above.

Titanium Dioxide Aerogel Particles

The titanium dioxide aerogel particles have an aerogel structure.

The terms "aerogel" and "aerogel structure" used herein refer to a structure formed by primary particles aggregating while forming a porous structure. Such a structure is a cluster structure formed by aggregation of spherical bodies having a diameter of the order of nanometers. The inside of the cluster structure is a three dimensional, fine network structure.

FIG. 1 schematically illustrates an example structure of aerogel particles. The aerogel particle illustrated in FIG. 1 is an aggregated particle formed by primary particles aggregating while forming a porous structure.

Since the primary particles constituting the aerogel structure of the titanium dioxide aerogel particles are strongly aggregated, the titanium dioxide aerogel particles are resistant to disintegration which is likely to occur when a shear stress is applied to a dispersion liquid including the titanium dioxide aerogel particles dispersed therein. The titanium dioxide aerogel particles are different from secondary particles formed by simple aggregation of primary particles of the titanium dioxide particles in that the titanium dioxide aerogel particles have an aerogel structure resistant to disintegration.

The average size of the primary particles constituting the titanium dioxide aerogel particles is preferably 1 nm or more and 200 nm or less, is more preferably 5 nm or more and 150 nm or less, and is further preferably 10 nm or more and 100 nm or less. The average size of the primary particles constituting the titanium dioxide aerogel particles is the arithmetic average of the equivalent circle diameters of 100 primary particles which is determined by the image analysis described above.

The volume-average size of the titanium dioxide aerogel particles is preferably 0.5 μm or more and 50 μm or less, is more preferably 0.8 μm or more and 30 μm or less, and is further preferably 1 μm or more and 20 μm or less. The volume-average size of the titanium dioxide aerogel particles is the particle size at which the cumulative volume of smaller particles reaches 50% of the total volume of the particles in the volume-based particle size distribution measured with the laser-diffraction particle sizing analyzer.

The BET specific surface area of the titanium dioxide aerogel particles is preferably 120 $m^2/g$ or more and 1000

$m^2/g$ or less, is more preferably 150 $m^2/g$ or more and 900 $m^2/g$ or less, and is further preferably 180 $m^2/g$ or more and 800 $m^2/g$ or less in order to enhance the photocatalytic activity of the photocatalyst particles. The BET specific surface area of the titanium dioxide aerogel particles is determined by a gas adsorption method in which a nitrogen gas is used.

The method for producing the titanium dioxide aerogel particles is not limited. A sol-gel process in which a titanium alkoxide is used as a raw material may be suitably used for forming the aerogel structure (the details are described below). That is, the titanium dioxide aerogel particles may be produced by hydrolysis and condensation of a titanium alkoxide.

The titanium dioxide aerogel particles may include a small amount of metal elements other than titanium, such as silicon and aluminum. The element ratio of silicon to titanium (Si/Ti) included in the titanium dioxide aerogel particles is, for example, 0 or more and 0.05 or less.

The primary particles constituting the titanium dioxide aerogel particles may be either amorphous or crystalline. Using crystalline primary particles may enhance the photocatalytic activity of the photocatalyst particles. In the case where the primary particles are crystalline, the crystal structure of the primary particles may be either a brookite, anatase, or rutile single-crystal structure or a mixed-crystal structure in which the above crystals coexist. When the primary particles are constituted by titanium dioxide particles having an anatase crystal structure, the photocatalytic activity of the photocatalyst particles may be enhanced. The crystal structure of the primary particles may be controlled by adjusting the heating temperature in the heat-treatment step described below.

Silica-Titania Composite Aerogel Particles

The silica-titania composite aerogel particles have an aerogel structure. The silica-titania composite aerogel particles are aerogel particles formed by primary particles that are silicon-titanium composite oxide particles aggregating while forming a porous structure.

In the description of the silica-titania composite aerogel particles, the aerogel particles formed by primary particles that are silicon-titanium composite oxide particles aggregating while forming a porous structure are referred to as "base particles".

The silica-titania composite aerogel particles may be the base particles or may include the base particles and a titania layer disposed on the base particles. In the case where a titania layer is formed on the base particles, at least the base particles have the aerogel structure. The titania layer may be a layer that includes titania covalently bonded to the surfaces of the base particles. The thickness of the titania layer is preferably 0.1 nm or more and 30 nm or less, is more preferably 0.2 nm or more and 10 nm or less, and is further preferably 0.3 nm or more and 5 nm or less.

In the silica-titania composite aerogel particles, the element ratio of silicon to titanium (Si/Ti) included in the base particles may be more than 0 and 6 or less. When the element ratio Si/Ti in the base particles is more than 0, silica included in the titania skeleton facilitates formation of pores in the aerogel particles. When the element ratio Si/Ti in the base particles is 6 or less, the titania skeleton readily produces the photocatalytic reaction. For the above reasons, the element ratio of silicon to titanium (Si/Ti) included in the base particles is more preferably 0.05 or more and 4 or less and is further preferably 0.1 or more and 3 or less.

The element ratio of silicon to titanium (Si/Ti) included in the base particles is determined by conducting a qualitative analysis (wide scan analysis) by X-ray photoelectron spectroscopy (XPS) and preparing the element profiles of the silica-titania composite aerogel particles.

The average size of the primary particles constituting the base particles is preferably 1 nm or more and 200 nm or less, is more preferably 5 nm or more and 150 nm or less, and is further preferably 10 nm or more and 100 nm or less. The average size of the primary particles constituting the base particles is the arithmetic average of the equivalent circle diameters of 100 primary particles which is determined by the image analysis described above.

The volume-average size of the silica-titania composite aerogel particles is preferably 0.5 μm or more and 50 μm or less, is more preferably 0.8 μm or more and 30 μm or less, and is further preferably 1 μm or more and 20 μm or less. The volume-average size of the silica-titania composite aerogel particles is the particle size at which the cumulative volume of smaller particles reaches 50% of the total volume of the particles in the volume-based particle size distribution measured with the laser-diffraction particle sizing analyzer.

The BET specific surface area of the silica-titania composite aerogel particles is preferably 200 $m^2/g$ or more and 1200 $m^2/g$ or less, is more preferably 300 $m^2/g$ or more and 1100 $m^2/g$ or less, and is further preferably 400 $m^2/g$ or more and 1000 $m^2/g$ or less in order to enhance the photocatalytic activity of the photocatalyst particles. The BET specific surface area of the silica-titania composite aerogel particles is determined by a gas adsorption method in which a nitrogen gas is used.

The method for producing the silica-titania composite aerogel particles is not limited. A sol-gel process in which an alkoxysilane and a titanium alkoxide are used as raw materials may be suitably used for forming the aerogel structure (the details are described below). The method for producing the silica-titania composite aerogel particles that include the titania layer is not limited. It is suitable to prepare the base particles by a sol-gel process in which an alkoxysilane and a titanium alkoxide are used as raw materials and form the titania layer on the surfaces of the base particles by a sol-gel process in which a titanium alkoxide is used as a raw material (the details are described below). That is, the base particles may be produced by hydrolysis and condensation of an alkoxysilane and a titanium alkoxide, and the titania layer may be produced by hydrolysis and condensation of a titanium alkoxide.

The titania layer is a layer that includes titania. The titania layer may include a small amount of metal elements other than titanium, such as silicon and aluminum. The element ratio of silicon to titanium (Si/Ti) included in the titania layer is, for example, 0 or more and 0.05 or less.

Metal Compound Including Metal Atom and Hydrocarbon Group (Organometallic Compound)

The green-light responsive photocatalyst particles include the titanium oxide compound-containing particles the surfaces of which are modified with an organometallic compound. Thus, the organometallic compound is present on the surfaces of the green-light responsive photocatalyst particles. When the organometallic compound is a metal compound composed only of metal atoms, carbon atoms, hydrogen atoms, and oxygen atoms, the green-light responsivity of the photocatalyst particles may be further enhanced.

When the organometallic compound is bonded to the surfaces of the titanium oxide compound-containing particles with an oxygen atom, the green-light responsivity of the photocatalyst particles may be further enhanced. The organometallic compound may be bonded to the surfaces of the titanium oxide compound-containing particles with an oxygen atom O directly bonded to the metal atom M included in the organometallic compound, that is, with a covalent bond represented by M-O—Ti. In the case where the titanium oxide compound-containing particles are the silica-titania composite aerogel particles, the organometallic compound may be bonded to the base particles or the titania layer with a covalent bond represented by M-O—Ti or M-O—Si.

The organometallic compound may include a metal atom M and a hydrocarbon group directly bonded to the metal atom M. In such a case, the green-light responsivity of the photocatalyst particles may be further enhanced. Such an organometallic compound may be bonded to the surfaces of the titanium oxide compound-containing particles with an O atom directly bonded to the metal atom M included in the organometallic compound. That is, a structure constituted by a hydrocarbon group, a metal atom M, an oxygen atom O, and a titanium atom Ti which are covalently bonded to one another in this order, that is, a structure represented by Hydrocarbon group-M-O—Ti, may be present on the surfaces of the titanium oxide compound-containing particles. In the case where the titanium oxide compound-containing particles are the silica-titania composite aerogel particles, a structure constituted by a hydrocarbon group, a metal atom M, an oxygen atom O, and a titanium atom Ti or silicon atom Si which are covalently bonded to one another in this order, that is, a structure represented by Hydrocarbon group-M-O—Ti or Hydrocarbon group-M-O—Si, may be present on the surfaces of the titanium oxide compound-containing particles.

In the case where the organometallic compound includes plural hydrocarbon groups, at least one of the hydrocarbon groups may be directly bonded to the metal atom included in the organometallic compound.

The state of chemical bonding on the surfaces of the photocatalyst particles and the state of chemical bonding between the atoms included in the organometallic compound can be determined by conducting a high resolution analysis (i.e., a narrow scan analysis) by XPS.

The metal atom included in the organometallic compound is preferably a silicon atom, an aluminum atom, or a titanium atom, and is more preferably a silicon atom or an aluminum atom, and is particularly preferably a silicon atom in order to further enhance the green-light responsivity of the photocatalyst particles.

Examples of the hydrocarbon group included in the organometallic compound include saturated and unsaturated aliphatic hydrocarbon groups having 1 to 40 carbon atoms, preferably having 1 to 20 carbon atoms, more preferably having 1 to 18 carbon atoms, further preferably having 4 to 12 carbon atoms, and most preferably having 4 to 10 carbon atoms; and aromatic hydrocarbon groups having 6 to 27 carbon atoms, preferably having 6 to 20 carbon atoms, more preferably having 6 to 18 carbon atoms, further preferably having 6 to 12 carbon atoms, and most preferably having 6 to 10 carbon atoms.

The hydrocarbon group included in the organometallic compound is preferably an aliphatic hydrocarbon group, is more preferably a saturated aliphatic hydrocarbon group, and is particularly preferably an alkyl group in order to enhance the green-light responsivity of the photocatalyst particles. The aliphatic hydrocarbon group may be linear, branched, or cyclic. When the aliphatic hydrocarbon group is linear or branched, the dispersibility of the photocatalyst particles may be enhanced. The number of the carbon atoms included in the aliphatic hydrocarbon group is preferably 1 to 20, is more preferably 1 to 18, is further preferably 4 to 12, and is most preferably 4 to 10.

Examples of the saturated aliphatic hydrocarbon group included in the organometallic compound include linear alkyl groups, such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group; branched alkyl groups, such as an isopropyl group, an isobutyl group, an isopentyl group, a neopentyl group, a 2-ethylhexyl group, a tert-butyl group, a tert-pentyl group, and an isopentadecyl group; and cyclic alkyl groups, such as a cyclopropyl group, a cyclopentyl group, a cyclohexyl group, a cycloheptyl group, a cyclooctyl group, a tricyclodecyl group, a norbornyl group, and an adamantyl group.

Examples of the unsaturated aliphatic hydrocarbon group included in the organometallic compound include alkenyl groups, such as a vinyl group (i.e., an ethenyl group), a 1-propenyl group, a 2-propenyl group, a 2-butenyl group, a 1-butenyl group, a 1-hexenyl group, a 2-dodecenyl group, and a pentenyl group; and alkynyl groups, such as an ethynyl group, a 1-propynyl group, a 2-propynyl group, a 1-butynyl group, a 3-hexynyl group, and a 2-dodecynyl group.

The aliphatic hydrocarbon group included in the organometallic compound may be a substituted aliphatic hydrocarbon group. Examples of a substituent group included in the aliphatic hydrocarbon group include a halogen atom, an epoxy group, a glycidyl group, a glycidoxy group, a mercapto group, a methacryloyl group, and an acryloyl group.

Examples of the aromatic hydrocarbon group included in the organometallic compound include a phenylene group, a biphenylene group, a terphenylene group, a naphthalene group, and an anthracene group.

The aromatic hydrocarbon group included in the organometallic compound may be a substituted aromatic hydrocarbon group. Examples of a substituent group included in the aromatic hydrocarbon group include a halogen atom, an epoxy group, a glycidyl group, a glycidoxy group, a mercapto group, a methacryloyl group, and an acryloyl group.

The organometallic compound may be a silane that includes a hydrocarbon group. Examples of the silane that includes a hydrocarbon group include chlorosilanes and alkoxysilanes. When the silane that includes a hydrocarbon group is the compound represented by Formula (1) below, the green-light responsivity of the photocatalyst particles may be enhanced.

$$R^1{}_n SiR^2{}_m \qquad (1)$$

In Formula (1), $R^1$ represents a saturated or unsaturated aliphatic hydrocarbon group having 1 to 20 carbon atoms or an aromatic hydrocarbon group having 6 to 20 carbon atoms; $R^2$ represents a halogen atom or an alkoxy group; n is an integer of 1 to 3; m is an integer of 1 to 3; and n+m=4. When n is an integer of 2 or 3, the plural $R^1$'s may represent the same group or different groups. When m is an integer of 2 or 3, the plural $R^2$'s may represent the same group or different groups.

The aliphatic hydrocarbon group represented by $R^1$ may be linear, branched, or cyclic. When the aliphatic hydrocarbon group is linear or branched, the dispersibility of the photocatalyst particles may be enhanced. The number of the carbon atoms included in the aliphatic hydrocarbon group is preferably 1 to 20, is more preferably 1 to 18, is further preferably 4 to 12, and is most preferably 4 to 10 in order to enhance the green-light responsivity of the photocatalyst particles. The aliphatic hydrocarbon group may be a saturated aliphatic hydrocarbon group or an unsaturated aliphatic hydrocarbon group. The aliphatic hydrocarbon group is preferably a saturated aliphatic hydrocarbon group and is more preferably an alkyl group in order to enhance the green-light responsivity of the photocatalyst particles.

Examples of the saturated aliphatic hydrocarbon group include linear alkyl groups, such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group; branched alkyl groups, such as an isopropyl group, an isobutyl group, an isopentyl group, a neopentyl group, a 2-ethylhexyl group, a tert-butyl group, a tert-pentyl group, and an isopentadecyl group; and cyclic alkyl groups, such as a cyclopropyl group, a cyclopentyl group, a cyclohexyl group, a cycloheptyl group, a cyclooctyl group, a tricyclodecyl group, a norbornyl group, and an adamantyl group.

Examples of the unsaturated aliphatic hydrocarbon group include alkenyl groups, such as a vinyl group (i.e., an ethenyl group), a 1-propenyl group, a 2-propenyl group, a 2-butenyl group, a 1-butenyl group, a 1-hexenyl group, a 2-dodecenyl group, and a pentenyl group; and alkynyl groups, such as an ethynyl group, a 1-propynyl group, a 2-propynyl group, a 1-butynyl group, a 3-hexynyl group, and a 2-dodecynyl group.

The aliphatic hydrocarbon group may be a substituted aliphatic hydrocarbon group. Examples of a substituent group included in the aliphatic hydrocarbon group include a halogen atom, an epoxy group, a glycidyl group, a glycidoxy group, a mercapto group, a methacryloyl group, and an acryloyl group.

The aromatic hydrocarbon group represented by $R^1$ preferably has 6 to 20 carbon atoms, more preferably has 6 to 18 carbon atoms, further preferably has 6 to 12 carbon atoms, and most preferably has 6 to 10 carbon atoms.

Examples of the aromatic hydrocarbon group include a phenylene group, a biphenylene group, a terphenylene group, a naphthalene group, and an anthracene group.

The aromatic hydrocarbon group may be a substituted aromatic hydrocarbon group. Examples of a substituent group included in the aromatic hydrocarbon group include a halogen atom, an epoxy group, a glycidyl group, a glycidoxy group, a mercapto group, a methacryloyl group, and an acryloyl group.

Examples of the halogen atom represented by $R^2$ include a fluorine atom, a chlorine atom, a bromine atom, and an iodine atom. The halogen atom is preferably a chlorine atom, a bromine atom, or an iodine atom.

Examples of the alkoxy group represented by $R^2$ include an alkoxy group having 1 to 10 carbon atoms, preferably having 1 to 8 carbon atoms, and more preferably having 3 to 8 carbon atoms. Examples of such an alkoxy group include a methoxy group, an ethoxy group, an isopropoxy group, a t-butoxy group, an n-butoxy group, an n-hexyloxy group, a 2-ethylhexyloxy group, and a 3,5,5-trimethylhexyloxy group. The alkoxy group may be a substituted alkoxy group. Examples of a substituent group included in the alkoxy group include a halogen atom, a hydroxyl group, an amino group, an alkoxy group, an amide group, and a carbonyl group.

When $R^1$ included in the compound represented by Formula (1) above is a saturated aliphatic hydrocarbon group, the green-light responsivity of the photocatalyst particles may be enhanced. In particular, it is suitable that, in the compound represented by Formula (1) above, $R^1$ be a saturated aliphatic hydrocarbon group having 1 to 20 carbon atoms, $R^2$ be a halogen atom or an alkoxy group, n be an integer of 1 to 3, and m be an integer of 1 to 3, where n+m=4.

Examples of the compound represented by Formula (1) above include the following:

silanes represented by Formula (1) in which n=1 and m=3, such as vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane;

silanes represented by Formula (1) in which n=2 and m=2, such as dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, and dichlorodiphenylsilane;

silanes represented by Formula (1) in which n=3 and m=1, such as trimethylmethoxysilane, trimethylethoxysilane, trimethylchlorosilane, decyldimethylchlorosilane, and triphenylchlorosilane; and silanes represented by Formula (1) in which $R^1$ is a substituted aliphatic hydrocarbon group or a substituted aromatic hydrocarbon group, such as 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and γ-glycidyloxypropylmethyldimethoxysilane.

The above silanes may be used alone or in combination of two or more.

The hydrocarbon group included in the silane represented by Formula (1) above is preferably an aliphatic hydrocarbon group, is more preferably a saturated aliphatic hydrocarbon group, and is particularly preferably an alkyl group in order to enhance the green-light responsivity of the photocatalyst particles. The hydrocarbon group included in the silane is preferably a saturated aliphatic hydrocarbon group having 1 to 20 carbon atoms, is more preferably a saturated aliphatic hydrocarbon group having 1 to 18 carbon atoms, is further preferably a saturated aliphatic hydrocarbon group having 4 to 12 carbon atoms, and is particularly preferably a saturated aliphatic hydrocarbon group having 4 to 10 carbon atoms in order to enhance the green-light responsivity of the photocatalyst particles.

Examples of the organometallic compound that includes an aluminum atom as a metal atom include an aluminum chelates, such as di-i-propoxyaluminum-ethylacetoacetate; and aluminate coupling agents, such as acetoalkoxy aluminum diisopropylate.

Examples of the organometallic compound that includes a titanium atom as a metal atom include titanate coupling agents, such as isopropyl triisostearoyl titanate, tetraoctyl bis(ditridecyl phosphite)titanate, and bis(dioctyl pyrophosphate)oxyacetate titanate; and titanium chelates, such as di-i-propoxy bis(ethyl acetoacetate) titanium, di-i-propoxy bis(acetylacetonate)titanium, di-i-propoxy bis(triethanolaminate)titanium, di-i-propoxy titanium diacetate, and di-i-propoxy titanium dipropionate.

Method for Producing Green-Light Responsive Photocatalyst Particles

The method for producing the green-light responsive photocatalyst particles is not limited and may include the following steps: a step in which the titanium oxide compound-containing particles are prepared; a step in which the surfaces of the titanium oxide compound-containing particles are modified with the organometallic compound (hereinafter, this step is referred to as "surface treatment step"); and a step in which the titanium oxide compound-containing particles the surfaces of which have been modified with the organometallic compound are heated in the surface treatment step or subsequent to the surface treatment step (hereinafter, this step is referred to as "heat treatment step").

Titanium Oxide Compound-Containing Particle Preparation Step

In the case where the titanium oxide compound-containing particles are titanium dioxide particles, the titanium dioxide particles may be prepared by producing titanium dioxide particles by the above-described production method. Alternatively, commercial titanium dioxide particles may be used.

In the case where the titanium oxide compound-containing particles are metatitanic acid particles, the metatitanic acid particles may be prepared by producing metatitanic acid particles by the above-described production method. Alternatively, commercial metatitanic acid particles may be used.

In the case where the titanium oxide compound-containing particles are titanium dioxide aerogel particles, the titanium dioxide aerogel particles may be produced by a production method that includes Steps (1) and (2) below:

Step (1): a step in which porous particles that include titanium dioxide are formed by a sol-gel process, and a dispersion liquid that includes the porous particles and a solvent is prepared.

Step (2): a step in which the solvent is removed from the dispersion liquid with supercritical carbon dioxide.

In Step (1), for example, a titanium alkoxide is used as a raw material, titanium dioxide is produced by the reaction (i.e., hydrolysis and condensation) of a titanium alkoxide, and a dispersion liquid that includes porous particles that include titanium dioxide and a solvent in which the porous particles are dispersed is prepared.

Specifically, Step (1) is, for example, the step described below. A titanium alkoxide is added to alcohol. While the resulting mixture is stirred, an acidic aqueous solution is added dropwise to the mixture in order to cause the reaction of the titanium alkoxide, which produces titanium dioxide. Hereby, a dispersion liquid that includes porous particles that include titanium dioxide and alcohol in which the porous particles are dispersed is prepared (hereinafter, this dispersion liquid is referred to as "porous particle dispersion liquid").

The size of primary particles and the size of the porous particles can be controlled by adjusting the amount of titanium alkoxide used in Step (1). Specifically, the larger the amount of titanium alkoxide used, the smaller the size of primary particles and the larger the size of the porous particles. The amount of titanium alkoxide used is preferably 4 parts by mass or more and 65 parts by mass or less and is more preferably 10 parts by mass or more and 50 parts by mass or less relative to 100 parts by mass of alcohol.

Examples of the titanium alkoxide used in Step (1) include tetraalkoxy titaniums, such as tetramethoxy titanium, tetraethoxy titanium, tetrapropoxy titanium, and tetrabutoxy titanium; and alkoxy titanium chelates some of the alkoxy groups of which are chelated, such as di-i-propoxy-bis(ethyl acetoacetate) titanium and di-i-propoxy-bis(acetylacetonate)titanium. The above titanium alkoxides may be used alone or in combination of two or more.

The porous particles may include a small amount of metal elements other than titanium, such as silicon and aluminum. Examples of a material used in Step (1) for adding silicon and aluminum to the porous particles include tetraalkoxysilanes, such as tetramethoxysilane, tetraethoxysilane, tetrapropoxysilane, and tetrabutoxysilane; alkyltrialkoxysilanes, such as methyltrimethoxysilane, methyltriethoxysilane, and ethyltriethoxysilane; alkyldialkoxysilanes, such as dimethyldimethoxysilane and dimethyldiethoxysilane; and aluminum alkoxides, such as aluminum isopropoxide. The above materials may be used in Step (1) such that the element ratio of silicon to titanium (Si/Ti) included in the porous particles falls within the range of 0 or more and 0.05 or less.

Examples of the alcohol used in Step (1) include methanol, ethanol, propanol, and butanol. These alcohols may be used alone or in combination of two or more.

Examples of an acid included in the acidic aqueous solution used in Step (1) include oxalic acid, acetic acid, hydrochloric acid, and nitric acid. The concentration of the acid in the acidic aqueous solution is preferably 0.001% by mass or more and 1% by mass or less and is more preferably 0.005% by mass or more and 0.01% by mass or less.

The amount of acidic aqueous solution used in Step (1) may be 0.001 parts by mass or more and 0.1 parts by mass or less relative to 100 parts by mass of titanium alkoxide.

The concentration of solid component in the porous particle dispersion liquid prepared in Step (1) may be 1% by mass or more and 30% by mass or less.

Step (2) is a step in which the dispersion liquid that includes the porous particles and a solvent is brought into contact with supercritical carbon dioxide in order to remove the solvent. The solvent removal treatment using supercritical carbon dioxide reduces the risk of pores of the porous particles being removed or becoming clogged compared with a solvent removal treatment using heat.

Specifically, Step (2) is conducted, for example, in the following manner. The porous particle dispersion liquid is charged into a sealed reactor. Liquefied carbon dioxide is introduced to the sealed reactor. Subsequently, while the sealed reactor is heated, the pressure of the inside of the sealed reactor is increased with a high-pressure pump in order to bring the carbon dioxide contained in the sealed reactor into a supercritical state. Then, liquefied carbon dioxide is charged into the sealed reactor to cause the supercritical carbon dioxide to discharge from the sealed reactor. Thereby, the supercritical carbon dioxide is passed through the porous particle dispersion liquid inside the sealed reactor. While the supercritical carbon dioxide is passed through the porous particle dispersion liquid, the solvent dissolves in the supercritical carbon dioxide and is removed from the sealed reactor together with the supercritical carbon dioxide discharging from the sealed reactor. The temperature and pressure of the inside of the sealed reactor are set to the temperature and pressure at which carbon dioxide is brought into a supercritical state. Since carbon dioxide has critical points of 31.1° C. and 7.38 MPa, the temperature and pressure of the inside of the sealed reactor are set to, for example, 50° C. or more and 200° C. or less and 10 MPa or more and 30 MPa or less.

The porous particles that remain inside the sealed reactor subsequent to Step (2) are the titanium dioxide aerogel particles.

In the case where the titanium oxide compound-containing particles are silica-titania composite aerogel particles, the silica-titania composite aerogel particles may be produced by a production method that includes Steps (A) and (B) below:

Step (A): a step in which the base particles are formed by a sol-gel process, and a dispersion liquid that includes the base particles and a solvent is prepared.

Step (B): a step in which the solvent is removed from the dispersion liquid with supercritical carbon dioxide.

Step (A) consists of two substeps, that is, Substeps (A1) and (A2) below, in order to form a titania layer on the surfaces of the base particles. In the case where the titania layer is not formed on the surfaces of the base particles, Step (A) consists only of Substep (A1).

Substep (A1): An alkoxysilane and a titanium alkoxide are added to alcohol. While the resulting mixture is stirred, an acidic aqueous solution is added dropwise to the mixture in order to cause the reaction of the alkoxysilane and the titanium alkoxide, which produces silicon-titanium composite oxide. Hereby, a dispersion liquid that includes the base particles and alcohol in which the base particles are dispersed is prepared (hereinafter, this dispersion liquid is referred to as "first dispersion liquid"). The base particles are aerogel particles formed by primary particles that are silicon-titanium composite oxide particles aggregating while forming a porous structure.

Substep (A2): While the first dispersion liquid is stirred, a liquid mixture of alcohol and titanium alkoxide is added dropwise to the first dispersion liquid in order to cause the reaction of the base particles and titanium alkoxide, which forms a titania layer on the surfaces of the base particles. Hereby, a dispersion liquid that includes porous particles that include the base particles and a titania layer disposed on the surfaces of the base particles and alcohol in which the porous particles are dispersed is prepared (hereinafter, this dispersion liquid is referred to as "second dispersion liquid").

The element ratio of silicon to titanium (Si/Ti) included in the base particles can be controlled by adjusting the mixing ratio between the alkoxysilane and the titanium alkoxide used in Substep (A1).

The size of the primary particles constituting the base particles and the size of the base particles can be controlled by adjusting the proportion of the total amount of alkoxysilane and titanium alkoxide to the amount of alcohol which are used in Substep (A1). The higher the proportion of the total amount of alkoxysilane and titanium alkoxide to the amount of alcohol, the smaller the size of the primary particles constituting the base particles and the larger the size of the base particles. The total amount of alkoxysilane and titanium alkoxide is preferably 4 parts by mass or more and 250 parts by mass or less and is more preferably 10 parts by mass or more and 50 parts by mass or less relative to 100 parts by mass of alcohol.

Examples of the alkoxysilane used in Substep (A1) include tetraalkoxysilanes, such as tetramethoxysilane, tetraethoxysilane, tetrapropoxysilane, and tetrabutoxysilane; alkyltrialkoxysilanes, such as methyltrimethoxysilane, methyltriethoxysilane, and ethyltriethoxysilane; and alkyldialkoxysilanes, such as dimethyldimethoxysilane and dimethyldiethoxysilane. The above alkoxysilanes may be used alone or in combination of two or more.

Examples of the titanium alkoxide used in Substeps (A1) and (A2) include tetraalkoxy titaniums, such as tetramethoxy titanium, tetraethoxy titanium, tetrapropoxy titanium, and tetrabutoxy titanium; and alkoxy titanium chelates some of the alkoxy groups of which are chelated, such as di-i-propoxy-bis(ethyl acetoacetate)titanium and di-i-propoxy-bis(acetylacetonate)titanium. The above titanium alkoxides may be used alone or in combination of two or more. The titanium alkoxide used in Substep (A1) may be identical to or different from that used in Substep (A2).

Examples of the alcohol used in Substeps (A1) and (A2) include methanol, ethanol, propanol, and butanol. These alcohols may be used alone or in combination of two or more. The alcohol used in Substep (A1) may be identical to or different from that used in Substep (A2).

Examples of an acid included in the acidic aqueous solution used in Substep (A1) include oxalic acid, acetic acid, hydrochloric acid, and nitric acid. The concentration of the acid in the acidic aqueous solution is preferably 0.001% by mass or more and 1% by mass or less and is more preferably 0.005% by mass or more and 0.01% by mass or less.

The amount of acidic aqueous solution used in Substep (A1) may be 0.001 parts by mass or more and 0.1 parts by mass or less relative to 100 parts by mass of the total amount of alkoxysilane and titanium alkoxide.

The concentration of solid component in the first dispersion liquid prepared in Substep (A1) may be 1% by mass or more and 30% by mass or less.

The concentration of solid component in the second dispersion liquid prepared in Substep (A2) may be 1% by mass or more and 30% by mass or less.

Step (B) is a step in which the dispersion liquid that includes the porous particles and a solvent is brought into contact with supercritical carbon dioxide in order to remove the solvent. The solvent removal treatment using supercritical carbon dioxide reduces the risk of pores of the porous particles being removed or becoming clogged compared with a solvent removal treatment using heat.

Specifically, Step (B) is conducted, for example, in the following manner. The porous particle dispersion liquid is charged into a sealed reactor. Liquefied carbon dioxide is introduced to the sealed reactor. Subsequently, while the sealed reactor is heated, the pressure of the inside of the sealed reactor is increased with a high-pressure pump in order to bring the carbon dioxide contained in the sealed reactor into a supercritical state. Then, liquefied carbon dioxide is charged into the sealed reactor to cause the supercritical carbon dioxide to discharge from the sealed reactor. Thereby, the supercritical carbon dioxide is passed through the porous particle dispersion liquid inside the sealed reactor. While the supercritical carbon dioxide is passed through the porous particle dispersion liquid, the solvent dissolves in the supercritical carbon dioxide and is removed from the sealed reactor together with the supercritical carbon dioxide discharging from the sealed reactor. The temperature and pressure of the inside of the sealed reactor are set to the temperature and pressure at which carbon dioxide is brought into a supercritical state. Since carbon dioxide has critical points of 31.1° C. and 7.38 MPa, the temperature and pressure of the inside of the sealed reactor are set to, for example, 50° C. or more and 200° C. or less and 10 MPa or more and 30 MPa or less.

The porous particles that remain inside the sealed reactor subsequent to Step (B) are the silica-titania composite aerogel particles.

Surface Treatment Step

The surface treatment step is a step in which the surfaces of the titanium oxide compound-containing particles are reacted with the organometallic compound. In the surface treatment step, the reactive group (i.e., a hydrolyzable group, such as a halogeno group or an alkoxy group) included in the organometallic compound reacts with the reactive group (e.g., a hydroxyl group) present on the surfaces of the titanium oxide compound-containing particles and, as a result, the surfaces of the titanium oxide compound-containing particles are modified with the organometallic compound.

Examples of the surface treatment method include, but are not limited to, the following: a method in which the organometallic compound is brought into direct contact with the titanium oxide compound-containing particles; and a method in which a treatment liquid produced by dissolving the organometallic compound in a solvent is brought into contact with the titanium oxide compound-containing particles. Specific examples of such a surface treatment method include the following: a method in which the titanium oxide compound-containing particles are dispersed in a solvent to form a dispersion liquid and, while the dispersion liquid is stirred, the organometallic compound or the treatment liquid is added to the dispersion liquid; and a method in which, while the titanium oxide compound-containing particles are fluidized by, for example, being stirred with a HENSCHEL mixer or the like, the organometallic compound or the treatment liquid is added (e.g., added dropwise or sprayed) to the titanium oxide compound-containing particles.

The surface treatment step may be conducted in an air atmosphere or in a nitrogen atmosphere. In the surface treatment step conducted in an air atmosphere or in a nitrogen atmosphere, the temperature of the inside of the reaction system in which the surface treatment is performed is preferably 15° C. or more and 150° C. or less and is more preferably 20° C. or more and 100° C. or less. The amount of time during which the surface treatment is performed is preferably 10 minutes or more and 120 minutes or less and is more preferably 30 minutes or more and 90 minutes or less.

In the case where the titanium oxide compound-containing particles are titanium dioxide aerogel particles or silica-titania composite aerogel particles (hereinafter, referred to collectively as "aerogel particles"), the surface treatment step may be a step in which the surfaces of the aerogel particles are modified with the organometallic compound in supercritical carbon dioxide when the aerogel particles are dried. Conducting the surface treatment step in supercritical carbon dioxide enables the organometallic compound to reach deep into the pores of the aerogel particles. In such a case, even portions deep inside the pores of the aerogel particles may be subjected to the surface treatment. Specifically, the surface treatment step using supercritical carbon dioxide is conducted by, for example, the following operation.

The aerogel particles and the organometallic compound are charged into a sealed reactor equipped with a stirrer. Liquefied carbon dioxide is introduced to the sealed reactor. Subsequently, while the sealed reactor is heated, the pressure of the inside of the sealed reactor is increased with a high-pressure pump in order to bring the carbon dioxide contained in the sealed reactor into a supercritical state. Then, the inside of the reaction system is stirred with the stirrer. The temperature and pressure of the inside of the sealed reactor are set to the temperature and pressure at which carbon dioxide is brought into a supercritical state. Since carbon dioxide has critical points of 31.1° C. and 7.38 MPa, the temperature and pressure of the inside of the sealed reactor are set to, for example, 50° C. or more and 200° C. or less and 10 MPa or more and 30 MPa or less. The amount of time during which the stirring is continued is preferably 10 minutes or more and 24 hours or less, is more preferably 20 minutes or more and 120 minutes or less, and is further preferably 30 minutes or more and 90 minutes or less.

The surface treatment step in which supercritical carbon dioxide is used is desirably conducted subsequent to Step (2) or Step (B) successively. Specifically, it is desirable to conduct the surface treatment step in the sealed reactor used in Step (2) or Step (B) without opening the sealed reactor to the atmospheric pressure subsequent to Step (2) or Step (B). Successively conducting steps in which supercritical carbon dioxide is used reduces the generation of coarse aerogel particles.

The form of the organometallic compound used in the surface treatment is as described above. The organometallic compounds may be used alone or in combination of two or more.

In the case where a treatment liquid prepared by mixing the organometallic compound with a solvent is used in the surface treatment step, the solvent used in the preparation of the treatment liquid is not limited and may be any chemical substance compatible with the organometallic compound. Examples of the solvent used in the preparation of the treatment liquid include following organic solvents: alcohols, such as methanol, ethanol, propanol, and butanol; toluene; ethyl acetate; and acetone.

The amount of the organometallic compound included in the treatment liquid is preferably 10 parts by mass or more and 200 parts by mass or less, is more preferably 20 parts by mass or more and 180 parts by mass or less, and is further preferably 50 parts by mass or more and 150 parts by mass or less relative to 100 parts by mass of the solvent.

The amount of the organometallic compound used in the surface treatment is preferably 10 parts by mass or more and 200 parts by mass or less, is more preferably 20 parts by mass or more and 180 parts by mass or less, and is further preferably 30 parts by mass or more and 150 parts by mass or less relative to 100 parts by mass of the titanium oxide compound-containing particles. When the amount of organometallic compound relative to 100 parts by mass of the titanium oxide compound-containing particles is 10 parts by mass or more, the green-light responsivity of the photocatalyst particles may be enhanced. In addition, the dispersibility of the photocatalyst particles may be enhanced. When the amount of organometallic compound relative to 100 parts by mass of the titanium oxide compound-containing particles is 200 parts by mass or less, an excessive increase in the amount of carbon present on the surfaces of the photocatalyst particles which is derived from the organometallic compound may be prevented and, consequently, a reduction in the photocatalytic reaction which is caused by excess carbon may be limited.

A drying treatment may be performed subsequent to the surface treatment in order to remove the residue substances, such as excess organometallic compound and the solvent included in the treatment liquid. Examples of the method for performing the drying treatment include vacuum drying, spray drying, and heat drying. The drying temperature may be set to 20° C. or more and 150° C. or less.

In the case where the titanium oxide compound-containing particles are aerogel particles, the drying treatment may be performed subsequent to the surface treatment by passing supercritical carbon dioxide through the particles in supercritical carbon dioxide to remove the solvent. The specific operation of the drying treatment is the same as in Step (2) or Step (B).

Heat Treatment Step

The heat treatment is performed in the step in which the titanium oxide compound-containing particles are subjected to the surface treatment or subsequent to the step in which the titanium oxide compound-containing particles are subjected to the surface treatment. Although the detailed mechanisms are not clear, it is considered that the titanium oxide compound-containing particles acquire a capability to absorb visible light when some of the hydrocarbon groups included in the organometallic compound become oxidized or carbonized by the heat treatment.

The heat treatment is performed at, at least, any of the following times: (i) When the titanium oxide compound-containing particles are subjected to the surface treatment using the organometallic compound; (ii) When the drying treatment is performed subsequent to the surface treatment; and (iii) After the drying treatment. When the heat treatment is performed at the time (ii) or (iii), the surfaces of the titanium oxide compound-containing particles may be modified to a sufficient degree. When the heat treatment is performed at the time (iii), the likelihood of the photocatalyst particles including foreign substances may be reduced.

The temperature at which the heat treatment is performed is preferably 180° C. or more and 500° C. or less, is more preferably 200° C. or more and 450° C. or less, and is further preferably 250° C. or more and 400° C. or less in order to enhance the green-light responsivity of the photocatalyst particles. The amount of time during which the heat treatment is performed is preferably 10 minutes or more and 300 minutes or less, is more preferably 20 minutes or more and 200 minutes or less, and is further preferably 30 minutes or more and 120 minutes or less in order to enhance the green-light responsivity of the photocatalyst particles. In the case where the heat treatment is performed within the step in which the titanium oxide compound-containing particles are subjected to the surface treatment, the reaction of the organometallic compound may be conducted to a sufficient degree at the temperature at which the surface treatment is to be performed before the heat treatment is performed at the temperature at which the heat treatment is to be performed. In the case where the heat treatment is performed within the drying treatment subsequent to the surface treatment, the drying treatment is performed at the temperature at which the heat treatment is to be performed.

When the heat treatment temperature is set to 180° C. or more and 500° C. or less, the photocatalyst particles having green-light responsivity may be produced efficiently. It is considered that, when the heat treatment is performed at 180° C. or more and 500° C. or less, the hydrocarbon groups present on the surfaces of the titanium oxide compound-containing particles, which are derived from the organometallic compound, become carbonized or oxidized to an appropriate degree.

The heat treatment may be performed in an atmosphere having an oxygen concentration of 1% or more and 21% or less by volume. When the heat treatment is performed in such an oxygen atmosphere, the hydrocarbon groups present on the surfaces of the titanium oxide compound-containing particles, which are derived from the organometallic compound, may become carbonized or oxidized to an appropriate degree with efficiency. The oxygen concentration in the oxygen atmosphere is more preferably 3% or more and 21% or less by volume and is further preferably 5% or more and 21% or less by volume.

The method of the heat treatment is not limited; for example, the following publicly known heating methods may be used: heating with an electric furnace, a baking furnace (e.g., a roller hearth kiln or a shuttle kiln), a radiation heating furnace, or a hot plate; and heating using a laser beam, infrared radiation, ultraviolet radiation, or a microwave.

The green-light responsive photocatalyst particles are produced by the above-described steps. The photocatalyst particles produced by the above-described steps include a surface layer disposed on the surfaces thereof, the surface layer including a metal compound that includes a metal atom and a hydrocarbon group.

In the case where the green-light responsive photocatalyst particles are photocatalyst particles produced by modifying the surfaces of silica-titania composite aerogel particles with the organometallic compound, specific examples of the form of the green-light responsive photocatalyst particles include the following two:

First form: Photocatalyst particles that include base particles that are aerogel particles produced by silicon-titanium composite oxide particles aggregating while forming a porous structure and a surface layer disposed on the base particles which includes a metal compound that includes a metal atom and a hydrocarbon group.

Second form: Photocatalyst particles that include base particles that are aerogel particles produced by silicon-titanium composite oxide particles aggregating while forming a porous structure, a titania layer disposed on the base particles, and a surface layer disposed on the titania layer which includes a metal compound that includes a metal atom and a hydrocarbon group.

Whether the green-light responsive photocatalyst particles are in the first form or the second form is confirmed by the method described below.

The photocatalyst particles are subjected to a qualitative analysis (wide scan analysis) by XPS while the surfaces of the photocatalyst particles are etched using noble gas ions in the depth direction in order to identify and measure at least titanium, silicon, and carbon. On the basis of the data obtained from the analysis, an element profile for each of the elements, that is, at least titanium, silicon, and carbon, is drawn with the vertical axis representing peak intensity and the horizontal axis representing etching time. The profile curves are divided into plural regions in accordance with the inflection points in order to identify a region reflective of the element composition of the base particles, a region reflective of the element composition of the titania layer, and a region reflective of the element composition of the surface layer. It is considered that the photocatalyst particles include the titania layer when the region reflective of the element composition of the titania layer is present on the element profiles. It is considered that the photocatalyst particles include the surface layer when the region reflective of the element composition of the surface layer is present on the element profiles.

Figure 2:
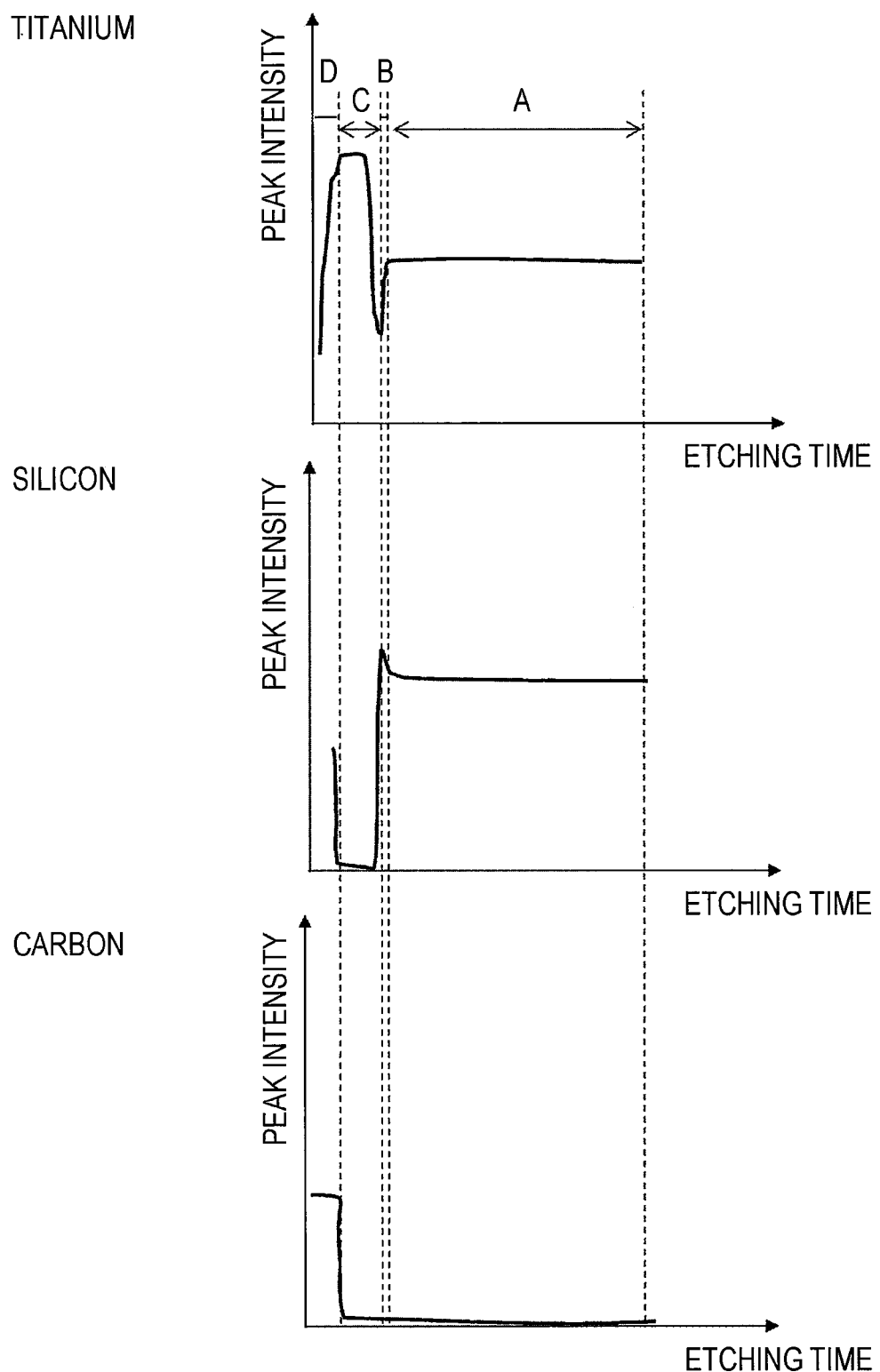
FIG. 2 is a diagram illustrating examples of element profiles of photocatalyst particles prepared using silica-titania composite aerogel particles as titanium oxide compound-containing particles.

Further description is made with reference to FIG. 2.

FIG. 2 illustrates an example of element profiles of photocatalyst particles produced by modifying the surfaces of silica-titania composite aerogel particles. FIG. 2 includes element profiles for titanium, silicon, and carbon in order from the top.

The element profiles illustrated in FIG. 2 are divided into the following regions A, B, C, and D in accordance with the inflection points of the profile curves.

Region A: A region observed in the final stage of etching, in which the peak intensities for titanium and silicon substantially do not change.

Region B: A region observed immediately before the region A, in which the peak intensity for titanium decreases and the peak intensity for silicon increases in the direction toward particle surface.

Region C: A region observed immediately before the region B, in which the peak intensity for titanium substantially does not change and silicon is hardly detected.

Region D: A region observed in the earliest stage of etching, in which the peak intensity for carbon substantially does not change and the metal element is detected.

The regions A and B reflect the element composition of the base particles. In the production of the base particles, silica and titania form a covalent bond at a specific ratio appropriate to the mixing ratio between alkoxysilane and titanium alkoxide, which are raw materials for silicon-titanium composite oxide, to form the base particles. Silica is more likely to appear on the surfaces of the base particles than titania. As a result, the region A is observed in the final stage of etching, in which the peak intensities for titanium and silicon substantially do not change, and the region B is observed immediately before the region A, in which the peak intensity for titanium decreases and the peak intensity for silicon increases in the direction toward particle surface.

The region C reflects the element composition of the titania layer. In the case where the region C, in which the peak intensity for titanium substantially does not change and silicon is hardly detected, is observed immediately before the region B, it is considered that the silica-titania composite aerogel particles include the titania layer.

Although the region C reflects the element composition of the titania layer, the region C does not always correspond to the titania layer exactly. A portion of the region C which is close to the region B may reflect the element composition of the base particles.

The region D reflects the element composition of the surface layer. In the case where the region D, in which the peak intensity for carbon substantially does not change and the metal element is detected, is observed in the earliest stage of etching, it is considered that the silica-titania composite aerogel particles include a surface layer that is a layer including the organometallic compound.

Since examples of the metal atom constituting the organometallic compound included in the surface layer include silicon, aluminum, and titanium, as needed, identification and measurement of aluminum may be conducted by XPS and the element profile for aluminum may be drawn.

Although the region D reflects the element composition of the surface layer, the region D does not always correspond to the surface layer exactly. A portion of the region D which is close to the region C may reflect the element composition of the titania layer or the base particles.

The element profiles illustrated in FIG. 2 confirm that the photocatalyst particles are silica-titania composite aerogel particles that include the base particles, the titania layer, and the surface layer and that the metal atom constituting the organometallic compound included in the surface layer is a silicon atom.

Aqueous Medium

The plant protection agent according to this exemplary embodiment may include, for example, the green-light responsive photocatalyst particles and an aqueous medium. In this exemplary embodiment, the green-light responsive photocatalyst particles may be dispersed in the aqueous medium.

Examples of the aqueous medium include water, such as tap water, distilled water, or ion-exchange water; and a liquid mixture of water and a water-soluble organic solvent.

Examples of the water-soluble organic solvent miscible with water include alcohols and ketones. When the water-soluble organic solvent is an alcohol, such as methanol, ethanol, propanol, or butanol, the dispersibility of the photocatalyst particles may be enhanced. Furthermore, the negative impact to plants (adverse reactions) may be reduced. In the case where the aqueous medium includes a water-soluble organic solvent, the ratio of the amount of photocatalyst particles to the amount of water-soluble organic solvent included in the plant protection agent according to this exemplary embodiment (photocatalyst particles:water-soluble organic solvent) is, for example, 1:1 to 1:200 by mass, is more preferably 1:5 to 1:100 by mass, and is further preferably 1:10 to 1:50 by mass.

The ratio of the amount of the aqueous medium to the amount of the photocatalyst particles included in the plant protection agent according to this exemplary embodiment (aqueous medium:photocatalyst particles) is preferably 100: 0.01 to 100:1 by mass, is more preferably 100:0.02 to 100:0.5 by mass, and is further preferably 100:0.05 to 100:0.3 by mass when the plant protection agent is sprayed to plants, in order to, for example, reduce the diseases of plants and the adverse effects of the agent to plants, enhance the dispersion stability of the photocatalyst particles, and make it easy to spray the plant protection agent to plants.

The proportion of the photocatalyst particles in the plant protection agent according to this exemplary embodiment may be higher than the above mass ratio. That is, the concentration of the photocatalyst particles in the plant protection agent may be higher than the above concentration. For example, the ratio of the amount of aqueous medium to the amount of photocatalyst particles (aqueous medium:photocatalyst particles) may be 100:1 to 100:40, 100:20, or 100:10 by mass. Such a plant protection agent may be diluted with an aqueous medium before being sprayed to plants such that the ratio of the aqueous medium to the photocatalyst particles falls within the above range in which the plant protection agent is sprayed to plants.

The green-light responsive photocatalyst particles may be formed by aggregation of primary particles dispersed in an aqueous medium. The volume-average size of the photocatalyst particles is preferably 0.5 µm or more and 50 µm or less, is more preferably 0.8 µm or more and 30 µm or less, and is further preferably 1 µm or more and 20 µm or less.

In the case where the green-light responsive photocatalyst particles are aerogel particles produced by modifying the surfaces of aerogel particles, photocatalyst particles having the above volume-average size may be produced by modifying the surfaces of aerogel particles having a volume-average size that falls within the above range.

In the case where the green-light responsive photocatalyst particles are titanium dioxide particles or metatitanic acid particles produced by modifying the surfaces of titanium dioxide particles or metatitanic acid particles, photocatalyst particles having the above volume-average particle size may be produced by modifying the surfaces of titanium dioxide particles or metatitanic acid particles having the average primary particle size described above, dispersing the primary particles in an aqueous medium that includes a binder (e.g., a water-soluble polymer, such as polyvinyl alcohol, polyvinylpyrrolidone, polyethylene oxide, polyethyleneimine, polyacrylic acid, carboxymethyl cellulose, or hydroxyethyl cellulose), causing the primary particles to aggregate into secondary particles, and applying an adequate shear stress to the secondary particles.

Other Components

The plant protection agent according to this exemplary embodiment may include components other than the green-light responsive photocatalyst particles or the aqueous medium. Examples of the other components include photocatalyst particles that do not absorb visible light and are responsive to ultraviolet radiation; a dispersing agent and a surfactant that enhance the dispersion stability of the photocatalyst particles; a colorant; an antifoaming agent; a thickener; and a preservative.

EXAMPLES

The plant protection agent according to the exemplary embodiment of the present disclosure is described further specifically with reference to Examples below. The materials, amounts, proportions, treatment orders, and the like described in Examples below may be changed without departing from the scope of the present disclosure. It is not intended that the scope of the plant protection agent according to the exemplary embodiment of the present disclosure be limited to the specific examples below.

In Tables 1 to 5, comparative examples are each shown as "C.E.".

Preparation of Photocatalyst Particles and Plant Protection Agent (A) Titanium Oxide Compound-Containing Particles are Titanium Dioxide Particles Example A1

To a dispersion liquid prepared by dispersing commercial anatase titanium dioxide particles "SSP-20" produced by Sakai Chemical Industry Co., Ltd. (volume-average size: 12 nm) in toluene, 30 parts by mass of octyltrimethoxysilane relative to 100 parts by mass of the titanium dioxide particles is added dropwise. After the reaction has been conducted at 80° C. for 1 hour, spray drying is performed with an outlet temperature of 120° C. Hereby, a dry powder is prepared. The dry powder is heated in an electric furnace at 290° C. for 90 minutes. Hereby, surface-modified titanium dioxide particles are prepared.

In 20 parts by mass of ethanol, 1 part by mass of the surface-modified titanium dioxide particles are dispersed. The resulting dispersion liquid is mixed with 0.1 parts by mass of polyvinylpyrrolidone and subsequently with 980 parts by mass of ion-exchange water. Hereby, a plant protection agent of Example A1 is prepared.

Comparative Example A1

In 20 parts by mass of ethanol, 1 part by mass of commercial anatase titanium dioxide particles "SSP-20" produced by Sakai Chemical Industry Co., Ltd. (volume-average size: 12 nm) are dispersed. The resulting dispersion liquid is mixed with 0.1 parts by mass of polyvinylpyrrolidone and subsequently with 980 parts by mass of ion-exchange water. Hereby, a plant protection agent of Comparative example A1 is prepared.

Comparative Example A2

Commercial anatase titanium dioxide particles "SSP-20" produced by Sakai Chemical Industry Co., Ltd. (volume-average size: 12 nm) are heated in an electric furnace under the same conditions as in Example A1. In 20 parts by mass of ethanol, 1 part by mass of the heated titanium dioxide particles are dispersed. The resulting dispersion liquid is mixed with 0.1 parts by mass of polyvinylpyrrolidone and subsequently with 980 parts by mass of ion-exchange water. Hereby, a plant protection agent of Comparative example A2 is prepared.

Comparative Example A3

A plant protection agent of Comparative example A3 is prepared as in Example A1, except that the heat treatment using an electric furnace is omitted.

Comparative Examples A4 and A5

Plant protection agents of Comparative examples A4 and A5 are prepared as in Example A1, except that the conditions under which the heat treatment is performed in an electric furnace are changed as described in Table 1.

Examples A2 to A14

Plant protection agents of Examples A2 to A14 are prepared as in Example A1, except that the type and amount of the organometallic compound used in the surface treatment and the conditions under which the heat treatment is performed in an electric furnace are changed as described in Table 1.

Examples A15 to A18

Plant protection agents of Examples A15 to A18 are prepared as in Example A1, except that the amount of water used in the preparation of the plant protection agent is changed as described in Table 1.

Example A19

A plant protection agent of Example A19 is prepared as in Example A1, except that the commercial anatase titanium dioxide particles used for surface modification in Example A1 are changed to anatase titanium dioxide particles having a volume-average size of 200 nm which are prepared by a sol-gel process.

Example A20

To a dispersion liquid prepared by dispersing commercial rutile titanium dioxide particles "STR-100N" produced by Sakai Chemical Industry Co., Ltd. (volume-average size: 16 nm) in toluene, 30 parts by mass of octyltrimethoxysilane relative to 100 parts by mass of the titanium dioxide particles is added dropwise. After the reaction has been conducted at 80° C. for 1 hour, spray drying is performed with an outlet temperature of 120° C. Hereby, a dry powder is prepared. The dry powder is heated in an electric furnace at 290° C. for 90 minutes to form surface-modified titanium dioxide particles.

In 20 parts by mass of ethanol, 1 part by mass of the surface-modified titanium dioxide particles are dispersed. The resulting dispersion liquid is mixed with 0.1 parts by mass of polyvinylpyrrolidone and subsequently with 980 parts by mass of ion-exchange water. Hereby, a plant protection agent of Example A20 is prepared.

Comparative Example A6

In 20 parts by mass of ethanol, 1 part by mass of commercial rutile titanium dioxide particles "STR-100N"

produced by Sakai Chemical Industry Co., Ltd. (volume-average size: 16 nm) are dispersed. The resulting dispersion liquid is mixed with 0.1 parts by mass of polyvinylpyrrolidone and subsequently with 980 parts by mass of ion-exchange water. Hereby, a plant protection agent of Comparative example A6 is prepared.

Comparative Example A7

Commercial rutile titanium dioxide particles "STR-100N" produced by Sakai Chemical Industry Co., Ltd. (volume-average size: 16 nm) are heated in an electric furnace under the same conditions as in Example A20. In 20 parts by mass of ethanol, 1 part by mass of the heated titanium dioxide particles are dispersed. The resulting dispersion liquid is mixed with 0.1 parts by mass of polyvinylpyrrolidone and subsequently with 980 parts by mass of ion-exchange water. Hereby, a plant protection agent of Comparative example A7 is prepared.

Comparative Example A8

A plant protection agent of Comparative example A8 is prepared as in Example A20, except that the heat treatment using an electric furnace is omitted.

Comparative Examples A9 and A10

Plant protection agents of Comparative examples A9 and A10 are prepared as in Example A20, except that the conditions under which the heat treatment is performed in an electric furnace are changed as described in Table 2.

Comparative Example A11

A solution is extracted from a commercial visible-light responsive photocatalyst spray "DINFHKON" produced by Kon Corporation. The solvent of the solution is removed by drying in order to extract nitrogen-doped titanium dioxide particles having a volume-average size of 30 nm. In 20 parts by mass of ethanol, 1 part by mass of the nitrogen-doped titanium dioxide particles are dispersed. The resulting dispersion liquid is mixed with 0.1 parts by mass of polyvinylpyrrolidone and subsequently with 980 parts by mass of ion-exchange water. Hereby, a plant protection agent of Comparative example A11 is prepared.

Comparative Example A12

The solvent of a commercial visible-light responsive photocatalyst sterilization liquid "RENECAT" produced by Toshiba Materials Co., Ltd. is removed by drying in order to extract copper-deposited tungsten oxide particles having a volume-average size of 20 nm. In 20 parts by mass of ethanol, 1 part by mass of the copper-deposited tungsten oxide particles are dispersed. The resulting dispersion liquid is mixed with 0.1 parts by mass of polyvinylpyrrolidone and subsequently with 980 parts by mass of ion-exchange water. Hereby, a plant protection agent of Comparative example A12 is prepared.

Comparative Example A13

A plant protection agent of Comparative example A13 is prepared as in Comparative example A11, except that the amount of water used in the preparation of the plant protection agent is changed as described in Table 2.

Comparative Example A14

A plant protection agent of Comparative example A14 is prepared as in Comparative example A12, except that the amount of water used in the preparation of the plant protection agent is changed as described in Table 2.

(B) Titanium Oxide Compound-Containing Particles are Metatitanic Acid Particles

Example B1

An anatase seed prepared separately is added to a titanyl sulfate solution having a $TiO_2$ concentration of 260 g/L and a $Ti^{3+}$ concentration of 6.0 g/L as $TiO_2$ in an amount that is 8% by mass as $TiO_2$ of the amount of $TiO_2$ included in the titanyl sulfate solution. The resulting solution is heated at a temperature equal to or higher than the boiling point to hydrolyze titanyl sulfate ($TiOSO_4$). Hereby, metatitanic acid particles are formed. The metatitanic acid particles are separated from the solution by filtration and washed with water sufficiently. The resulting solid component is mixed with water to form a metatitanic acid slurry (1). The volume-average size of particles included in the metatitanic acid slurry (1) is 42 nm.

While the metatitanic acid slurry (1) is stirred, a 5 N aqueous sodium hydroxide solution is added dropwise to the metatitanic acid slurry (1) in order to adjust the pH of the metatitanic acid slurry (1) to be 8.5. The metatitanic acid slurry (1) is stirred for 2 hours. Subsequently, 6 N hydrochloric acid is added to the metatitanic acid slurry (1) in order to adjust the pH of the metatitanic acid slurry (1) to be 5.8. Then, the particles are separated from the slurry (1) by filtration and washed with water. Subsequent to the washing, water is added to the particles to form a slurry. While the slurry is stirred, 6 N hydrochloric acid is added dropwise to the slurry in order to adjust the pH of the slurry to be 1.3. The stirring is continued for 3 hours. Subsequently, 100 parts by mass of metatitanic acid is fractionated from the slurry. While the metatitanic acid is held at 60° C. and stirred, 30 parts by mass of hexyltrimethoxysilane is added to the metatitanic acid. The resulting mixture is stirred for 30 minutes. A 7 N aqueous sodium hydroxide solution is added to the mixture in order to adjust the pH of the mixture to be 7. Subsequently, the particles are separated from the mixture by filtration and washed with water. The resulting solid component is spray-dried with a flash dryer at an outlet temperature of 150° C. Hereby, a dry powder is prepared. The dry powder is heated in an electric furnace at 320° C. for 90 minutes to form surface-modified metatitanic acid particles.

In 20 parts by mass of ethanol, 1 part by mass of the surface-modified metatitanic acid particles are dispersed. The resulting dispersion liquid is mixed with 0.1 parts by mass of polyvinylpyrrolidone and subsequently with 980 parts by mass of ion-exchange water. Hereby, a plant protection agent of Example B1 is prepared.

Comparative Example B1

The metatitanic acid slurry (1) prepared in Example B1 is spray-dried with a flash dryer at an outlet temperature of 150° C. Hereby, metatitanic acid particles are prepared. In 20 parts by mass of ethanol, 1 part by mass of the metatitanic acid particles are dispersed. The resulting dispersion liquid is mixed with 0.1 parts by mass of polyvinylpyrrolidone and subsequently with 980 parts by mass of ion-exchange water. Hereby, a plant protection agent of Comparative example B1 is prepared.

Comparative Example B2

The metatitanic acid slurry (1) prepared in Example B1 is spray-dried with a flash dryer at an outlet temperature of 150° C. Hereby, metatitanic acid particles are prepared. The metatitanic acid particles are heated in an electric furnace under the same conditions as in Example B1. In 20 parts by mass of ethanol, 1 part by mass of the heated metatitanic acid particles are dispersed. The resulting dispersion liquid is mixed with 0.1 parts by mass of polyvinylpyrrolidone and subsequently with 980 parts by mass of ion-exchange water. Hereby, a plant protection agent of Comparative example B2 is prepared.

Comparative Example B3

A plant protection agent of Comparative example B3 is prepared as in Example B1, except that the heat treatment using an electric furnace is omitted.

Comparative Examples B4 and B5

Plant protection agents of Comparative examples B4 and B5 are prepared as in Example B1, except that the conditions under which the heat treatment is performed in an electric furnace are changed as described in Table 3.

Examples B2 to B15

Plant protection agents of Examples B2 to B15 are prepared as in Example B1, except that the type and amount of the organometallic compound used in the surface treatment and the conditions under which the heat treatment is performed in an electric furnace are changed as described in Table 3.

Examples B16 to B21

Plant protection agents of Examples B16 to B21 are prepared as in Example B1, except that the amounts of binder (i.e., polyvinylpyrrolidone) and water used in the preparation of the plant protection agent is changed as described in Table 3.

(C) Titanium Oxide Compound-Containing Particles are Titanium Dioxide Aerogel Particles Example C1

Into a reaction container, 115.4 parts by mass of methanol and 14.3 parts by mass of tetrabutoxy titanium are charged and mixed with each other. While the resulting liquid mixture is stirred with a magnetic stirrer at a rotation speed of 100 rpm, 7.5 parts by mass of a 0.009 mass % aqueous oxalic acid solution is added dropwise to the liquid mixture over 30 seconds. Subsequently, the liquid mixture is stirred for 30 minutes. Hereby, 137.2 parts by mass (solid component: 3.4 mass parts, liquid phase: 133.8 mass parts) of a dispersion liquid (1) is prepared.

The dispersion liquid (1) is charged into a sealed reactor. While the dispersion liquid (1) is stirred at a rotation speed of 85 rpm, $CO_2$ is charged into the sealed reactor, and the temperature and pressure inside the sealed reactor are increased to 150° C. and 20 MPa. Subsequently, while the dispersion liquid (1) is stirred, $CO_2$ is charged into and discharged from the sealed reactor for 60 minutes in order to remove the liquid phase.

To 100 parts by mass of the solid phase that remains after the removal of the liquid phase, a mixture of 100 parts by mass of isobutyltrimethoxysilane and 100 parts by mass of methanol is added over 5 minutes. While the resulting mixture is stirred at a rotation speed of 85 rpm, the mixture is held at 150° C. and 20 MPa for 30 minutes. Subsequently, while the mixture is stirred, $CO_2$ is charged into and discharged from the sealed reactor for 30 minutes in order to remove the liquid phase. After the pressure has been reduced to the atmospheric pressure over 30 minutes, the resulting power is recovered.

The powder is charged into an SUS container and heated in an electric furnace at 380° C. for 60 minutes. Hereby, surface-modified titanium dioxide aerogel particles are prepared.

One part by mass of the surface-modified titanium dioxide aerogel particles are mixed with 20 parts by mass of ethanol and subsequently with 980 parts by mass of ion-exchange water. Hereby, a plant protection agent of Example C1 is prepared.

Comparative Example C1

The liquid phase of the dispersion liquid (1) prepared in Example C1 is removed using supercritical $CO_2$. Hereby, titanium dioxide aerogel particles are prepared. One part by mass of the titanium dioxide aerogel particles are mixed with 20 parts by mass of ethanol and subsequently with 980 parts by mass of ion-exchange water. Hereby, a plant protection agent of Comparative example C1 is prepared.

Comparative Example C2

The liquid phase of the dispersion liquid (1) prepared in Example C1 is removed using supercritical $CO_2$. Hereby, titanium dioxide aerogel particles are prepared. The titanium dioxide aerogel particles are heated in an electric furnace under the same conditions as in Example C1. One part by mass of the heated titanium dioxide aerogel particles are mixed with 20 parts by mass of ethanol and subsequently mixed with 980 parts by mass of ion-exchange water. Hereby, a plant protection agent of Comparative example C2 is prepared.

Comparative Example C3

A plant protection agent of Comparative example C3 is prepared as in Example C1, except that the heat treatment using an electric furnace is omitted.

Comparative Examples C4 and C5

Plant protection agents of Comparative examples C4 and C5 are prepared as in Example C1, except that the conditions under which the heat treatment is performed in an electric furnace are changed as described in Table 4.

Examples C2 to C15

Plant protection agents of Examples C2 to C15 are prepared as in Example C1, except that the type and amount of the organometallic compound used in the surface treatment and the conditions under which the heat treatment is performed in an electric furnace are changed as described in Table 4.

(D) Titanium Oxide Compound-Containing Particles are Silica-Titania Composite Aerogel Particles (First Form, without Titania Layer)

Example D1

Into a reaction container, 115.4 parts by mass of methanol and 7.2 parts by mass of tetramethoxysilane are charged and mixed with each other. Into the reaction container, 7.2 parts by mass of tetrabutoxy titanium is further charged. While the resulting liquid mixture is stirred with a magnetic stirrer at a rotation speed of 100 rpm, 7.5 parts by mass of a 0.009 mass % aqueous oxalic acid solution is added dropwise to the liquid mixture over 30 seconds. Subsequently, the liquid mixture is stirred for 35 minutes. Hereby, 137.2 parts by mass (solid component: 4.5 mass parts, liquid phase: 132.7 mass parts) of a dispersion liquid (I-1) is prepared.

The dispersion liquid (I-1) is charged into a sealed reactor. While the dispersion liquid (I-1) is stirred at a rotation speed of 85 rpm, $CO_2$ is charged into the sealed reactor, and the temperature and pressure inside the sealed reactor are increased to 150° C. and 20 MPa. Subsequently, while the dispersion liquid (I-1) is stirred, $CO_2$ is charged into and discharged from the sealed reactor for 60 minutes in order to remove the liquid phase.

To 100 parts by mass of the solid phase that remains after the removal of the liquid phase, a mixture of 100 parts by mass of isobutyltrimethoxysilane and 100 parts by mass of methanol is added over 5 minutes. While the resulting mixture is stirred at a rotation speed of 85 rpm, the mixture is held at 150° C. and 20 MPa for 30 minutes. Subsequently, while the mixture is stirred, $CO_2$ is charged into and discharged from the sealed reactor for 30 minutes in order to remove the liquid phase. After the pressure has been reduced to the atmospheric pressure over 30 minutes, the resulting power is recovered.

The powder is charged into an SUS container and heated in an electric furnace at 380° C. for 60 minutes. Hereby, surface-modified silica-titania composite aerogel particles are prepared.

One part by mass of the surface-modified silica-titania composite aerogel particles are mixed with 20 parts by mass of ethanol and subsequently with 980 parts by mass of ion-exchange water. Hereby, a plant protection agent of Example D1 is prepared.

Comparative Example D1

The liquid phase of the dispersion liquid (I-1) prepared in Example D1 is removed using supercritical $CO_2$. Hereby, silica-titania composite aerogel particles are prepared. One part by mass of the silica-titania composite aerogel particles are mixed with 20 parts by mass of ethanol and subsequently with 980 parts by mass of ion-exchange water. Hereby, a plant protection agent of Comparative example D1 is prepared.

Comparative Example D2

The liquid phase of the dispersion liquid (I-1) prepared in Example D1 is removed using supercritical $CO_2$. Hereby, silica-titania composite aerogel particles are prepared. The silica-titania composite aerogel particles are heated in an electric furnace under the same conditions as in Example D1. One part by mass of the heated silica-titania composite aerogel particles are mixed with 20 parts by mass of ethanol and subsequently mixed with 980 parts by mass of ion-exchange water. Hereby, a plant protection agent of Comparative example D2 is prepared.

Comparative Example D3

A plant protection agent of Comparative example D3 is prepared as in Example D1, except that the heat treatment using an electric furnace is omitted.

Comparative Examples D4 and D5

Plant protection agents of Comparative examples D4 and D5 are prepared as in Example D1, except that the conditions under which the heat treatment is performed in an electric furnace are changed as described in Table 5.

Examples D2 to D15

Plant protection agents of Examples D2 to D15 are prepared as in Example D1, except that the type and amount of the organometallic compound used in the surface treatment and the conditions under which the heat treatment is performed in an electric furnace are changed as described in Table 5.

(E) Titanium Oxide Compound-Containing Particles are Silica-Titania Composite Aerogel Particles (Second Form, with Titania Layer)

Example E1

Into a reaction container, 115.4 parts by mass of methanol and 7.2 parts by mass of tetramethoxysilane are charged and mixed with each other. Into the reaction container, 7.2 parts by mass of tetrabutoxy titanium is further charged. While the resulting liquid mixture is stirred with a magnetic stirrer at a rotation speed of 100 rpm, 7.5 parts by mass of a 0.009 mass % aqueous oxalic acid solution is added dropwise to the liquid mixture over 30 seconds. Subsequently, the liquid mixture is stirred for 35 minutes. Hereby, 137.2 parts by mass (solid component: 4.5 mass parts, liquid phase: 132.7 mass parts) of a dispersion liquid (I-1) is prepared.

Into a sealed reactor, 137.2 parts by mass of the dispersion liquid (I-1) is charged. While the dispersion liquid (I-1) is stirred with a magnetic stirrer at a rotation speed of 100 rpm, a liquid mixture of 0.45 parts by mass of tetrabutoxy titanium and 4.05 parts by mass of butanol is added dropwise to the dispersion liquid (I-1) over 10 minutes. The resulting mixture is stirred for 30 minutes. Hereby, 141.7 parts by mass (solid component: 3.5 mass parts, liquid phase: 138.2 mass parts) of a dispersion liquid (II-1) is prepared.

The dispersion liquid (II-1) is charged into a sealed reactor. While the dispersion liquid (II-1) is stirred at a rotation speed of 85 rpm, $CO_2$ is charged into the sealed reactor, and the temperature and pressure inside the sealed reactor are increased to 150° C. and 20 MPa. Subsequently, while the dispersion liquid (II-1) is stirred, $CO_2$ is charged into and discharged from the sealed reactor for 60 minutes in order to remove the liquid phase.

To 100 parts by mass of the solid phase that remains after the removal of the liquid phase, a mixture of 100 parts by mass of isobutyltrimethoxysilane and 100 parts by mass of methanol is added over 5 minutes. While the resulting mixture is stirred at a rotation speed of 85 rpm, the mixture is held at 150° C. and 20 MPa for 30 minutes. Subsequently, while the mixture is stirred, $CO_2$ is charged into and discharged from the sealed reactor for 30 minutes in order to remove the liquid phase. After the pressure has been reduced to the atmospheric pressure over 30 minutes, the resulting power is recovered.

The powder is charged into an SUS container and heated in an electric furnace at 380° C. for 60 minutes. Hereby, surface-modified silica-titania composite aerogel particles are prepared.

One part by mass of the surface-modified silica-titania composite aerogel particles are mixed with 20 parts by mass of ethanol and subsequently with 980 parts by mass of ion-exchange water. Hereby, a plant protection agent of Example E1 is prepared.

Comparative Example E1

The liquid phase of the dispersion liquid (II-1) prepared in Example E1 is removed using supercritical $CO_2$. Hereby, silica-titania composite aerogel particles are prepared. One part by mass of the silica-titania composite aerogel particles are mixed with 20 parts by mass of ethanol and subsequently with 980 parts by mass of ion-exchange water. Hereby, a plant protection agent of Comparative example E1 is prepared.

Comparative Example E2

The liquid phase of the dispersion liquid (II-1) prepared in Example E1 is removed using supercritical $CO_2$. Hereby, silica-titania composite aerogel particles are prepared. The silica-titania composite aerogel particles are heated in an electric furnace under the same conditions as in Example E1. One part by mass of the heated silica-titania composite aerogel particles are mixed with 20 parts by mass of ethanol and subsequently mixed with 980 parts by mass of ion-exchange water. Hereby, a plant protection agent of Comparative example E2 is prepared.

Comparative Example E3

A plant protection agent of Comparative example E3 is prepared as in Example E1, except that the heat treatment using an electric furnace is omitted.

Comparative Examples E4 and E5

Plant protection agents of Comparative examples E4 and E5 are prepared as in Example E1, except that the conditions under which the heat treatment is performed in an electric furnace are changed as described in Table 6.

Examples E2 to E15

Plant protection agents of Examples E2 to E15 are prepared as in Example E1, except that the type and amount of the organometallic compound used in the surface treatment and the conditions under which the heat treatment is performed in an electric furnace are changed as described in Table 6.

Measurement of Physical Properties of Photocatalyst Particles

The physical properties of each of the photocatalyst particle samples prepared in Examples above are measured by the following methods. Tables 1 to 6 summarize the results. The absorbances at wavelengths of 450, 550, 650, 750 nm described in Tables 1 to 6 are expressed with the absorbance at 350 nm being 1.

Ultraviolet-Visible Absorption Spectrum

A specific one of the photocatalyst particle samples is dispersed in tetrahydrofuran. The resulting dispersion liquid is applied onto a glass substrate and dried at 24° C. in an air atmosphere. The diffuse reflectance spectrum in a wavelength range of 200 to 900 nm is measured using a spectrophotometer "U-4100" produced by Hitachi High-Technologies Corporation with a scanning speed of 600 nm, a slit width of 2 nm, and a sampling interval of 1 nm at a position of diffuse reflection. The absorbances at the specific wavelengths are theoretically determined from the diffuse reflectance spectrum by Kubelka-Munk transformation. Since the absorbances may have an error resulting from the glass substrate depending on, for example, the thickness of the coating layer composed of the particles deposited, the absorbances are corrected for the error. That is, the absorbances at the specific wavelengths minus the absorbance at 900 nm are used.

The photocatalyst particles prepared in Examples A1 to A20, Examples B1 to B21, Examples C1 to C15, Examples D1 to D15, and Examples E1 to E15 have absorption over the entire wavelength range of 500 nm or more and 600 nm or less. The photocatalyst particles prepared in Examples A1 to A20, Examples B1 to B21, Examples C1 to C15, Examples D1 to D15, and Examples E1 to E15 have absorption over the entire wavelength range of 350 nm or more and 800 nm or less.

BET Specific Surface Area of Photocatalyst Particles

The BET specific surface area of each of the photocatalyst particle samples prepared in Examples C1 to C15, Comparative examples C1 to C5, Examples D1 to D15, Comparative examples D1 to D5, Examples E1 to E15, and Comparative examples E1 to E5 are measured.

Specifically, a specific surface area measuring apparatus "MACSORB HM model-1201" produced by Mountech Co., Ltd. is used. In order to perform deaeration, 50 mg of the sample is subjected to a pretreatment at 30° C. for 120 minutes. Subsequently, the BET specific surface area of the sample is determined by a BET multipoint method in which a nitrogen gas having a purity of 99.99% or more is used.

Element Ratio Si/Ti in Base Particles

Each of the photocatalyst particle samples prepared in Examples D1 to D15, Comparative examples D1 to D5, Examples E1 to E15, and Comparative examples E1 to E5 are subjected to an XPS analysis.

Specifically, the sample is subjected to a qualitative analysis (wide scan analysis) using an XPS analyzer while the surfaces of the photocatalyst particles are etched in the depth direction under the following conditions, in order to identify and measure titanium, silicon, and carbon. On the basis of the data obtained from the analysis, an element profile of each of the elements, that is, titanium, silicon, and carbon, is drawn with the vertical axis representing peak intensity and the horizontal axis representing etching time. The profile curves are divided into plural regions in accordance with the inflection points. A region in which the peak intensities for titanium and silicon substantially do not change (i.e., the region A above) is specified. The element ratio Si/Ti in the region is determined.

XPS analyzer: "VERSAPROBE II" produced by ULVAC-PHI, Incorporated
X-ray source: monochromatic AlKα radiation
Accelerating voltage: 15 kV
X-ray beam diameter: 100 μm
Etching gun: argon ion beam
Etching power: 4 kV It is confirmed from the element profiles that each of the photocatalyst particle samples prepared in Examples D1 to D15 includes a surface layer disposed on the base particles. It is confirmed from the element profiles that each of the photocatalyst particle samples prepared in Examples E1 to E15 includes a titania layer and a surface layer disposed on the base particles.

Volume-Average Size (Da) of Photocatalyst Particles

After a specific one of the plant protection agents has been passed through a sieve having an opening of 106 μm in order to remove coarse particles, the sizes of the particles included in the plant protection agent are measured with a laser-diffraction particle sizing analyzer "LS 13 320" produced by Beckman Coulter, Inc. Then, a volume-based particle size distribution is determined. The particle size D50v at which the cumulative volume of smaller particles reaches 50% of the total volume of the particles is determined. The particle size D50v is taken as the volume-average size Da (μm) of the particles.

Average Primary Size (Dp) of Photocatalyst Particles

A specific one of the plant protection agents is dropped onto a silicon substrate and dried. Hereby, a specimen for SEM observation is prepared. An image of the particles included in the specimen is taken with a scanning electron microscope "S-4100" produced by Hitachi, Ltd. The SEM image is captured into an image processor "LUZEXIII" produced by NIRECO CORPORATION. The equivalent circle diameters (nm) of primary particles are calculated by image analysis. The arithmetic average of the equivalent circle diameters of 100 primary particles is calculated.

Evaluations of Performance of Plant Protection Agent

A specific one of the plant protection agents is sprayed to roses that are being cultivated indoors. The performance of the plant protection agent is evaluated by conducting the following tests. The interior lighting used is an LED with a wavelength range of 400 to 800 nm. The illuminance of the LED is adjusted to be 800 lux. Tables 1 to 6 summarize the results.

Reduction in Black Spot Disease

A specific one of the plant protection agents is sprayed onto rose leaves that are confirmed to be infected with black spot disease such that one of the surfaces of each leaf becomes wet. The leaves are irradiated with an LED with an illuminance of 800 lux for 12 hours per day. After a lapse of four days, the degree of black spot disease is inspected. In the evaluation of the degree of black spot disease, the proportion of the total area of all fungi to the area of the surface of the leaf is measured visually, and the average over ten leaves is used for the evaluation. The evaluation criteria are as follows.

A: No fungi are confirmed on the surface of the leaf.
B: The area of the fungi is less than 25% of the area of the leaf.
C: The area of the fungi is 25% or more and less than 50% of the area of the leaf.
D: The area of the fungi is 50% or more and less than 75% of the area of the leaf.
E: The area of the fungi is 75% or more and 100% or less of the area of the leaf.

Reduction in Powdery Mildew

A specific one of the plant protection agents is sprayed onto rose leaves that are confirmed to be infected with powdery mildew such that one of the surfaces of each leaf becomes wet. The leaves are irradiated with an LED with an illuminance of 800 lux for 12 hours per day. After a lapse of four days, the degree of powdery mildew is inspected. In the evaluation of the degree of powdery mildew, the proportion of the total area of all fungi to the area of the surface of the leaf is measured visually, and the average over ten leaves is used for the evaluation. The evaluation criteria are as follows.

A: No fungi are confirmed on the surface of the leaf.
B: The area of the fungi is less than 25% of the area of the leaf.
C: The area of the fungi is 25% or more and less than 50% of the area of the leaf.
D: The area of the fungi is 50% or more and less than 75% of the area of the leaf.
E: The area of the fungi is 75% or more and 100% or less of the area of the leaf.

Damage to Plants

A specific one of the plant protection agents is sprayed onto rose leaves such that one of the surfaces of each leaf becomes wet. The leaves are irradiated with an LED with an illuminance of 800 lux for 12 hours per day. After a lapse of four days, the degree of damage of the leaves is inspected. Damage to plants is evaluated on the basis of the number of leaves which are confirmed damaged, that is, for example, fallen from the tree or withered, among ten leaves to which the plant protection agent has been sprayed. The evaluation criteria are as follows.

A: All the leaves are free from damages, such as falling and withering.
B: The number of leaves subjected to damages, such as falling and withering, is 1 or 2.
C: The number of leaves subjected to damages, such as falling and withering, is 3 or more and 5 or less.
D: The number of leaves subjected to damages, such as falling and withering, is 6 or 7.
E: The number of leaves subjected to damages, such as falling and withering, 8 or more.

TABLE 1

| | Titanium oxide compound-containing particles | Surface treatment Organometallic compound Type | Amount [part] | Heat treatment Temperature [° C.] | Time [minute] | UV-Vis properties Absorbance at 450 nm | Absorbance at 550 nm | Absorbance at 650 nm |
|---|---|---|---|---|---|---|---|---|
| Example A1 | Anatase titanium dioxide | Octyltrimethoxysilane | 30 | 290 | 90 | 0.38 | 0.24 | 0.08 |
| C. E. A1 | Anatase titanium dioxide | — | | — | | 0.00 | 0.00 | 0.00 |
| C. E. A2 | Anatase titanium dioxide | — | | 290 | 90 | 0.01 | 0.00 | 0.00 |
| C. E. A3 | Anatase titanium dioxide | Octyltrimethoxysilane | 30 | — | | 0.00 | 0.00 | 0.00 |
| C. E. A4 | Anatase titanium dioxide | Octyltrimethoxysilane | 30 | 160 | 90 | 0.02 | 0.00 | 0.00 |
| C. E. A5 | Anatase titanium dioxide | Octyltrimethoxysilane | 30 | 600 | 60 | 0.03 | 0.00 | 0.00 |

TABLE 1-continued

| | | | | | | | | |
|---|---|---|---|---|---|---|---|---|
| Example A2 | Anatase titanium dioxide | Octyltrimethoxysilane | 30 | 500 | 90 | 0.19 | 0.11 | 0.05 |
| Example A3 | Anatase titanium dioxide | Octyltrimethoxysilane | 30 | 250 | 90 | 0.25 | 0.12 | 0.06 |
| Example A4 | Anatase titanium dioxide | Octyltrimethoxysilane | 30 | 180 | 120 | 0.09 | 0.04 | 0.02 |
| Example A5 | Anatase titanium dioxide | Octyltrimethoxysilane | 50 | 290 | 90 | 0.39 | 0.27 | 0.11 |
| Example A6 | Anatase titanium dioxide | Octyltrimethoxysilane | 25 | 290 | 90 | 0.22 | 0.11 | 0.06 |
| Example A7 | Anatase titanium dioxide | Isobutyltrimethoxysilane | 30 | 290 | 90 | 0.32 | 0.22 | 0.07 |
| Example A8 | Anatase titanium dioxide | Hexyltrimethoxysilane | 30 | 290 | 90 | 0.34 | 0.26 | 0.10 |
| Example A9 | Anatase titanium dioxide | Decyltrimethoxysilane | 30 | 290 | 90 | 0.33 | 0.24 | 0.09 |
| Example A10 | Anatase titanium dioxide | Dodecyltrimethoxysilane | 30 | 290 | 90 | 0.30 | 0.24 | 0.08 |
| Example A11 | Anatase titanium dioxide | Octadecyltrimethoxysilane | 30 | 290 | 90 | 0.26 | 0.16 | 0.04 |
| Example A12 | Anatase titanium dioxide | Phenyltrimethoxysilane | 30 | 290 | 90 | 0.29 | 0.21 | 0.05 |
| Example A13 | Anatase titanium dioxide | Acetoalkoxy aluminum diisopropylate | 30 | 290 | 90 | 0.15 | 0.06 | 0.03 |
| Example A14 | Anatase titanium dioxide | Isopropyl triisostearoyl titanate | 30 | 290 | 90 | 0.18 | 0.09 | 0.04 |
| Example A15 | Anatase titanium dioxide | Octyltrimethoxysilane | 30 | 290 | 90 | 0.38 | 0.24 | 0.08 |
| Example A16 | Anatase titanium dioxide | Octyltrimethoxysilane | 30 | 290 | 90 | 0.38 | 0.24 | 0.08 |
| Example A17 | Anatase titanium dioxide | Octyltrimethoxysilane | 30 | 290 | 90 | 0.38 | 0.24 | 0.08 |
| Example A18 | Anatase titanium dioxide | Octyltrimethoxysilane | 30 | 290 | 90 | 0.38 | 0.24 | 0.08 |
| Example A19 | Anatase titanium dioxide (sol-gel process) | Octyltrimethoxysilane | 30 | 290 | 90 | 0.26 | 0.12 | 0.06 |

| | UV-Vis properties | | Plant protection agent | | Size of particles included in plant protection agent | | Evaluation of performance of plant protection agent | | |
|---|---|---|---|---|---|---|---|---|---|
| | | | Amount of photocatalyst particles relative to 100 parts of aqueous medium | | | | Reduction in plant diseases | | |
| | Absorbance at 750 nm | Absorbance ratio 650 nm/550 nm | Water Amount [part] | medium [part] | Da [μm] | Dp [nm] | Black spot disease | Powdery mildew | Damage to plants |
| Example A1 | 0.03 | 0.33 | 980 | 0.10 | 7.5 | 10 | A | A | A |
| C. E. A1 | 0.00 | 0.00 | 980 | 0.10 | 15.5 | 11 | E | E | A |
| C. E. A2 | 0.00 | 0.00 | 980 | 0.10 | 18.5 | 12 | E | E | A |
| C. E. A3 | 0.00 | 0.00 | 980 | 0.10 | 9.5 | 10 | E | E | A |
| C. E. A4 | 0.00 | 0.00 | 980 | 0.10 | 12.0 | 11 | D | E | A |
| C. E. A5 | 0.00 | 0.00 | 980 | 0.10 | 13.5 | 9 | D | D | A |
| Example A2 | 0.02 | 0.45 | 980 | 0.10 | 10.0 | 9 | B | B | A |
| Example A3 | 0.03 | 0.50 | 980 | 0.10 | 10.0 | 10 | A | B | B |
| Example A4 | 0.02 | 0.50 | 980 | 0.10 | 8.0 | 11 | C | C | A |
| Example A5 | 0.05 | 0.41 | 980 | 0.10 | 11.0 | 9 | A | A | C |
| Example A6 | 0.03 | 0.55 | 980 | 0.10 | 6.5 | 10 | B | B | A |
| Example A7 | 0.03 | 0.32 | 980 | 0.10 | 8.5 | 11 | A | A | A |
| Example A8 | 0.05 | 0.38 | 980 | 0.10 | 9.0 | 9 | A | A | A |
| Example A9 | 0.03 | 0.38 | 980 | 0.10 | 11.5 | 10 | A | A | A |
| Example A10 | 0.03 | 0.33 | 980 | 0.10 | 11.5 | 9 | A | A | A |
| Example A11 | 0.02 | 0.25 | 980 | 0.10 | 15.5 | 10 | B | B | A |
| Example A12 | 0.02 | 0.24 | 980 | 0.10 | 16.0 | 11 | A | A | A |
| Example A13 | 0.02 | 0.50 | 980 | 0.10 | 12.5 | 10 | C | C | B |
| Example A14 | 0.02 | 0.44 | 980 | 0.10 | 10.5 | 9 | C | B | B |
| Example A15 | 0.03 | 0.33 | 1980 | 0.05 | 5.0 | 11 | A | B | A |
| Example A16 | 0.03 | 0.33 | 9980 | 0.01 | 4.5 | 10 | C | C | A |
| Example A17 | 0.03 | 0.33 | 180 | 0.50 | 9.5 | 11 | A | A | B |
| Example A18 | 0.03 | 0.33 | 80 | 1.00 | 10.0 | 10 | A | A | C |
| Example A19 | 0.02 | 0.50 | 980 | 0.10 | 12.5 | 195 | C | B | A |

TABLE 2

| | Titanium oxide compound-containing particles or comparative particles | Surface treatment Organometallic compound | | Heat treatment | | UV-Vis properties | | |
|---|---|---|---|---|---|---|---|---|
| | | Type | Amount [part] | Temperature [° C.] | Time [minute] | Absorbance at 450 nm | Absorbance at 550 nm | Absorbance at 650 nm |
| Example A20 | Rutile titanium dioxide | Octyltrimethoxysilane | 30 | 290 | 90 | 0.32 | 0.18 | 0.07 |
| C. E. A6 | Rutile titanium dioxide | — | | — | | 0.00 | 0.00 | 0.00 |
| C. E. A7 | Rutile titanium dioxide | — | | 290 | 90 | 0.02 | 0.00 | 0.00 |

TABLE 2-continued

| | | | | | | | | |
|---|---|---|---|---|---|---|---|---|
| C. E. A8 | Rutile titanium dioxide | Octyltrimethoxysilane | 30 | — | | 0.00 | 0.00 | 0.00 |
| C. E. A9 | Rutile titanium dioxide | Octyltrimethoxysilane | 30 | 160 | 90 | 0.02 | 0.00 | 0.00 |
| C. E. A10 | Rutile titanium dioxide | Octyltrimethoxysilane | 30 | 600 | 60 | 0.04 | 0.00 | 0.00 |
| C. E. A11 | Nitrogen-doped titanium dioxide | — | | — | | 0.39 | 0.04 | 0.00 |
| C. E. A12 | Copper-deposited tungsten dioxide | — | | — | | 0.20 | 0.01 | 0.00 |
| C. E. A13 | Nitrogen-doped titanium dioxide | — | | — | | 0.39 | 0.04 | 0.00 |
| C. E. A14 | Copper-deposited tungsten dioxide | — | | — | | 0.20 | 0.01 | 0.00 |

| | UV-Vis properties | | Plant protection agent | | | | Evaluation of performance of plant protection agent | | |
|---|---|---|---|---|---|---|---|---|---|
| | | | | Amount of photocatalyst particles relative to 100 parts of aqueous agent | Size of particles included in plant protection agent | | Reduction in plant diseases | | |
| | Absorbance at 750 nm | Absorbance ratio 650 nm/550 nm | Water Amount [part] | medium [part] | Da [μm] | Dp [nm] | Black spot disease | Powdery mildew | Damage to plants |
| Example A20 | 0.03 | 0.39 | 980 | 0.10 | 7.0 | 15 | B | B | A |
| C. E. A6 | 0.00 | 0.00 | 980 | 0.10 | 12.0 | 13 | E | E | A |
| C. E. A7 | 0.00 | 0.00 | 980 | 0.10 | 16.0 | 14 | E | E | A |
| C. E. A8 | 0.00 | 0.00 | 980 | 0.10 | 9.0 | 15 | E | E | A |
| C. E. A9 | 0.00 | 0.00 | 980 | 0.10 | 13.0 | 16 | D | E | A |
| C. E. A10 | 0.00 | 0.00 | 980 | 0.10 | 12.0 | 14 | D | D | A |
| C. E. A11 | 0.00 | 0.00 | 980 | 0.10 | 6.5 | 30 | D | D | C |
| C. E. A12 | 0.00 | 0.00 | 980 | 0.10 | 5.5 | 20 | D | D | C |
| C. E. A13 | 0.00 | 0.00 | 1980 | 0.05 | 6.5 | 30 | E | E | B |
| C. E. A14 | 0.00 | 0.00 | 1980 | 0.05 | 5.5 | 20 | E | E | B |

TABLE 3

| | Titanium oxide compound-containing particles | Surface treatment Organometallic compound | | Heat treatment | |
|---|---|---|---|---|---|
| | | Type | Amount [part] | Temperature [° C.] | Time [minute] |
| Example B1 | Metatitanic acid | Hexyltrimethoxysilane | 30 | 320 | 90 |
| C. E. B1 | Metatitanic acid | — | | — | |
| C. E. B2 | Metatitanic acid | — | | 320 | 90 |
| C. E. B3 | Metatitanic acid | Hexyltrimethoxysilane | 30 | — | |
| C. E. B4 | Metatitanic acid | Hexyltrimethoxysilane | 30 | 160 | 90 |
| C. E. B5 | Metatitanic acid | Hexyltrimethoxysilane | 30 | 600 | 90 |
| Example B2 | Metatitanic acid | Hexyltrimethoxysilane | 30 | 500 | 90 |
| Example B3 | Metatitanic acid | Hexyltrimethoxysilane | 30 | 250 | 90 |
| Example B4 | Metatitanic acid | Hexyltrimethoxysilane | 30 | 180 | 120 |
| Example B5 | Metatitanic acid | Hexyltrimethoxysilane | 50 | 320 | 90 |
| Example B6 | Metatitanic acid | Hexyltrimethoxysilane | 25 | 320 | 90 |
| Example B7 | Metatitanic acid | Methyltrimethoxysilane | 25 | 320 | 90 |
| Example B8 | Metatitanic acid | Isobutyltrimethoxysilane | 30 | 320 | 90 |
| Example B9 | Metatitanic acid | Decyltrimethoxysilane | 30 | 320 | 90 |
| Example B10 | Metatitanic acid | Dodecyltrimethoxysilane | 30 | 320 | 90 |
| Example B11 | Metatitanic acid | Octadecyltrimethoxysilane | 30 | 320 | 90 |
| Example B12 | Metatitanic acid | Phenyltrimethoxysilane | 30 | 320 | 90 |
| Example B13 | Metatitanic acid | Hexamethyldisilazane | 50 | 320 | 90 |
| Example B14 | Metatitanic acid | Acetoalkoxy aluminum diisopropylate | 30 | 320 | 90 |
| Example B15 | Metatitanic acid | Isopropyl triisostearoyl titanate | 30 | 320 | 90 |
| Example B16 | Metatitanic acid | Hexyltrimethoxysilane | 30 | 320 | 90 |
| Example B17 | Metatitanic acid | Hexyltrimethoxysilane | 30 | 320 | 90 |
| Example B18 | Metatitanic acid | Hexyltrimethoxysilane | 30 | 320 | 90 |
| Example B19 | Metatitanic acid | Hexyltrimethoxysilane | 30 | 320 | 90 |
| Example B20 | Metatitanic acid | Hexyltrimethoxysilane | 30 | 320 | 90 |
| Example B21 | Metatitanic acid | Hexyltrimethoxysilane | 30 | 320 | 90 |

TABLE 3-continued

| | UV-Vis properties | | | | |
|---|---|---|---|---|---|
| | Absorbance at 450 nm | Absorbance at 550 nm | Absorbance at 650 nm | Absorbance at 750 nm | Absorbance ratio 650 nm/550 nm |
| Example B1 | 0.35 | 0.21 | 0.08 | 0.04 | 0.38 |
| C. E. B1 | 0.00 | 0.00 | 0.00 | 0.00 | 0.00 |
| C. E. B2 | 0.01 | 0.00 | 0.00 | 0.00 | 0.00 |
| C. E. B3 | 0.00 | 0.00 | 0.00 | 0.00 | 0.00 |
| C. E. B4 | 0.01 | 0.00 | 0.00 | 0.00 | 0.00 |
| C. E. B5 | 0.03 | 0.00 | 0.00 | 0.00 | 0.00 |
| Example B2 | 0.21 | 0.10 | 0.03 | 0.02 | 0.30 |
| Example B3 | 0.15 | 0.07 | 0.03 | 0.02 | 0.43 |
| Example B4 | 0.05 | 0.03 | 0.02 | 0.02 | 0.67 |
| Example B5 | 0.36 | 0.19 | 0.09 | 0.04 | 0.47 |
| Example B6 | 0.22 | 0.12 | 0.04 | 0.02 | 0.33 |
| Example B7 | 0.12 | 0.06 | 0.03 | 0.02 | 0.50 |
| Example B8 | 0.37 | 0.24 | 0.09 | 0.03 | 0.38 |
| Example B9 | 0.31 | 0.18 | 0.09 | 0.03 | 0.50 |
| Example B10 | 0.28 | 0.16 | 0.06 | 0.02 | 0.38 |
| Example B11 | 0.25 | 0.15 | 0.06 | 0.02 | 0.40 |
| Example B12 | 0.18 | 0.11 | 0.04 | 0.02 | 0.36 |
| Example B13 | 0.09 | 0.08 | 0.03 | 0.02 | 0.38 |
| Example B14 | 0.15 | 0.08 | 0.03 | 0.02 | 0.38 |
| Example B15 | 0.16 | 0.07 | 0.03 | 0.02 | 0.43 |
| Example B16 | 0.35 | 0.21 | 0.08 | 0.04 | 0.38 |
| Example B17 | 0.35 | 0.21 | 0.08 | 0.04 | 0.38 |
| Example B18 | 0.35 | 0.21 | 0.08 | 0.04 | 0.38 |
| Example B19 | 0.35 | 0.21 | 0.08 | 0.04 | 0.38 |
| Example B20 | 0.35 | 0.21 | 0.08 | 0.04 | 0.38 |
| Example B21 | 0.35 | 0.21 | 0.08 | 0.04 | 0.38 |

| | | | Plant protection agent | | | | |
|---|---|---|---|---|---|---|---|
| | | | | Size of particles included in plant protection agent | | Evaluation of performance of plant protection agent | |
| | | | | | | Reduction in plant diseases | |
| | Binder | Water | Amount of photocatalyst particles relative to 100 parts of aqueous medium | | | Black | |
| | Amount [part] | Amount [part] | [part] | Da [μm] | Dp [nm] | spot disease | Powdery mildew | Damage to plants |
| Example B1 | 0.1 | 980 | 0.10 | 4.5 | 38 | A | A | A |
| C. E. B1 | 0.1 | 980 | 0.10 | 8.5 | 40 | E | E | A |
| C. E. B2 | 0.1 | 980 | 0.10 | 6.0 | 40 | E | E | A |
| C. E. B3 | 0.1 | 980 | 0.10 | 7.5 | 42 | E | E | A |
| C. E. B4 | 0.1 | 980 | 0.10 | 4.0 | 39 | D | E | A |
| C. E. B5 | 0.1 | 980 | 0.10 | 3.5 | 40 | D | D | A |
| Example B2 | 0.1 | 980 | 0.10 | 5.0 | 42 | B | A | A |
| Example B3 | 0.1 | 980 | 0.10 | 5.5 | 39 | B | B | B |
| Example B4 | 0.1 | 980 | 0.10 | 4.0 | 40 | C | C | A |
| Example B5 | 0.1 | 980 | 0.10 | 5.5 | 42 | A | A | C |
| Example B6 | 0.1 | 980 | 0.10 | 6.0 | 42 | B | B | A |
| Example B7 | 0.1 | 980 | 0.10 | 2.5 | 41 | C | C | A |
| Example B8 | 0.1 | 980 | 0.10 | 5.5 | 42 | A | A | A |
| Example B9 | 0.1 | 980 | 0.10 | 6.0 | 39 | A | A | A |
| Example B10 | 0.1 | 980 | 0.10 | 4.5 | 40 | A | A | A |
| Example B11 | 0.1 | 980 | 0.10 | 3.5 | 40 | A | B | A |
| Example B12 | 0.1 | 980 | 0.10 | 5.0 | 42 | B | B | A |
| Example B13 | 0.1 | 980 | 0.10 | 5.5 | 41 | B | C | A |
| Example B14 | 0.1 | 980 | 0.10 | 3.5 | 42 | C | C | B |
| Example B15 | 0.1 | 980 | 0.10 | 4.5 | 40 | C | B | C |
| Example B16 | 0 | 980 | 0.10 | 0.6 | 40 | A | A | B |
| Example B17 | 0.05 | 980 | 0.10 | 0.9 | 39 | A | A | B |
| Example B18 | 0.3 | 980 | 0.10 | 15.5 | 44 | A | A | A |
| Example B19 | 0.1 | 320 | 0.29 | 10.5 | 42 | A | A | A |
| Example B20 | 0.1 | 4980 | 0.02 | 1.5 | 43 | C | B | A |
| Example B21 | 0.1 | 180 | 0.50 | 10.5 | 41 | A | A | B |

TABLE 4

| | Titanium oxide compound-containing particles | Surface treatment Organometallic compound | | Heat treatment | | UV-Vis properties | |
|---|---|---|---|---|---|---|---|
| | | Type | Amount [part] | Temperature [° C.] | Time [minute] | Absorbance at 450 nm | Absorbance at 550 nm |
| Example C1 | Titanium dioxide aerogel | Isobutyltrimethoxysilane | 100 | 380 | 60 | 0.33 | 0.18 |
| C. E. C1 | Titanium dioxide aerogel | — | | — | | 0.00 | 0.00 |
| C. E. C2 | Titanium dioxide aerogel | — | | 380 | 60 | 0.01 | 0.00 |
| C. E. C3 | Titanium dioxide aerogel | Isobutyltrimethoxysilane | 100 | — | | 0.00 | 0.00 |
| C. E. C4 | Titanium dioxide aerogel | Isobutyltrimethoxysilane | 100 | 150 | 60 | 0.01 | 0.00 |
| C. E. C5 | Titanium dioxide aerogel | Isobutyltrimethoxysilane | 100 | 580 | 60 | 0.03 | 0.01 |
| Example C2 | Titanium dioxide aerogel | Isobutyltrimethoxysilane | 100 | 500 | 60 | 0.19 | 0.09 |
| Example C3 | Titanium dioxide aerogel | Isobutyltrimethoxysilane | 100 | 280 | 60 | 0.22 | 0.14 |
| Example C4 | Titanium dioxide aerogel | Isobutyltrimethoxysilane | 100 | 180 | 120 | 0.09 | 0.06 |
| Example C5 | Titanium dioxide aerogel | Isobutyltrimethoxysilane | 120 | 380 | 60 | 0.36 | 0.21 |
| Example C6 | Titanium dioxide aerogel | Isobutyltrimethoxysilane | 80 | 380 | 60 | 0.26 | 0.14 |
| Example C7 | Titanium dioxide aerogel | Methyltrimethoxysilane | 90 | 380 | 60 | 0.09 | 0.04 |
| Example C8 | Titanium dioxide aerogel | Hexyltrimethoxysilane | 100 | 380 | 60 | 0.34 | 0.20 |
| Example C9 | Titanium dioxide aerogel | Decyltrimethoxysilane | 100 | 380 | 60 | 0.29 | 0.16 |
| Example C10 | Titanium dioxide aerogel | Octadecyltrimethoxysilane | 100 | 380 | 60 | 0.26 | 0.14 |
| Example C11 | Titanium dioxide aerogel | Phenyltrimethoxysilane | 100 | 380 | 60 | 0.22 | 0.12 |
| Example C12 | Titanium dioxide aerogel | n-Octyldimethylchlorosilane | 100 | 380 | 60 | 0.15 | 0.09 |
| Example C13 | Titanium dioxide aerogel | Hexamethyldisilazane | 120 | 380 | 60 | 0.11 | 0.07 |
| Example C14 | Titanium dioxide aerogel | Isopropyl triisostearoyl titanate | 100 | 380 | 60 | 0.16 | 0.08 |
| Example C15 | Titanium dioxide aerogel | Acetoalkoxy aluminum diisopropylate | 100 | 380 | 60 | 0.14 | 0.07 |

| | UV-Vis properties | | | | Size of particles included in plant protection agent | | Evaluation of performance of plant protection agent | | |
|---|---|---|---|---|---|---|---|---|---|
| | | | | | | | Reduction in plant diseases | | |
| | Absorbance at 650 nm | Absorbance at 750 nm | Absorbance ratio 650 nm/550 nm | BET surface area [m2/g] | Da [μm] | Dp [nm] | Black spot disease | Powdery mildew | Damage to plants |
| Example C1 | 0.06 | 0.04 | 0.33 | 350 | 18.5 | 95 | A | A | A |
| C. E. C1 | 0.00 | 0.00 | 0.00 | 430 | 22.0 | 85 | E | E | A |
| C. E. C2 | 0.00 | 0.00 | 0.00 | 390 | 23.0 | 90 | E | E | A |
| C. E. C3 | 0.00 | 0.00 | 0.00 | 320 | 22.0 | 95 | E | E | A |
| C. E. C4 | 0.00 | 0.00 | 0.00 | 340 | 17.0 | 92 | E | E | A |
| C. E. C5 | 0.00 | 0.00 | 0.00 | 390 | 19.0 | 90 | D | E | A |
| Example C2 | 0.04 | 0.02 | 0.44 | 375 | 15.5 | 93 | B | B | A |
| Example C3 | 0.06 | 0.04 | 0.43 | 340 | 18.0 | 92 | B | C | B |
| Example C4 | 0.03 | 0.02 | 0.50 | 330 | 12.5 | 94 | C | C | A |
| Example C5 | 0.09 | 0.03 | 0.43 | 280 | 28.5 | 95 | A | A | C |
| Example C6 | 0.06 | 0.02 | 0.43 | 330 | 20.0 | 96 | B | A | A |
| Example C7 | 0.02 | 0.02 | 0.50 | 360 | 23.0 | 93 | C | C | A |
| Example C8 | 0.11 | 0.05 | 0.55 | 380 | 15.0 | 92 | A | A | A |
| Example C9 | 0.07 | 0.03 | 0.44 | 290 | 24.0 | 100 | A | A | A |
| Example C10 | 0.05 | 0.02 | 0.36 | 260 | 45.0 | 105 | A | A | A |
| Example C11 | 0.05 | 0.02 | 0.42 | 300 | 17.0 | 97 | B | A | A |
| Example C12 | 0.04 | 0.02 | 0.44 | 340 | 16.5 | 92 | B | B | B |
| Example C13 | 0.03 | 0.02 | 0.43 | 380 | 19.0 | 90 | C | B | A |
| Example C14 | 0.04 | 0.02 | 0.50 | 320 | 17.0 | 95 | B | B | C |
| Example C15 | 0.04 | 0.02 | 0.57 | 300 | 21.0 | 93 | B | C | B |

TABLE 5

| | Titanium oxide compound-containing particles | Surface treatment Organometallic compound | | Heat treatment | |
|---|---|---|---|---|---|
| | | Type | Amount [part] | Temperature [° C.] | Time [minute] |
| Example D1 | Silica-titania composite aerogel | Isobutyltrimethoxysilane | 100 | 380 | 60 |
| C. E. D1 | Silica-titania composite aerogel | — | | — | |
| C. E. D2 | Silica-titania composite aerogel | — | | 380 | 60 |
| C. E. D3 | Silica-titania composite aerogel | Isobutyltrimethoxysilane | 100 | — | |
| C. E. D4 | Silica-titania composite aerogel | Isobutyltrimethoxysilane | 100 | 110 | 60 |
| C. E. D5 | Silica-titania composite aerogel | Isobutyltrimethoxysilane | 100 | 580 | 80 |
| Example D2 | Silica-titania composite aerogel | Isobutyltrimethoxysilane | 100 | 500 | 60 |
| Example D3 | Silica-titania composite aerogel | Isobutyltrimethoxysilane | 100 | 280 | 60 |
| Example D4 | Silica-titania composite aerogel | Isobutyltrimethoxysilane | 100 | 180 | 120 |

TABLE 5-continued

| | | | | | |
|---|---|---|---|---|---|
| Example D5 | Silica-titania composite aerogel | Isobutyltrimethoxysilane | 120 | 380 | 60 |
| Example D6 | Silica-titania composite aerogel | Isobutyltrimethoxysilane | 80 | 380 | 60 |
| Example D7 | Silica-titania composite aerogel | Methyltrimethoxysilane | 90 | 380 | 60 |
| Example D8 | Silica-titania composite aerogel | Hexyltrimethoxysilane | 100 | 380 | 60 |
| Example D9 | Silica-titania composite aerogel | Decyltrimethoxysilane | 100 | 380 | 60 |
| Example D10 | Silica-titania composite aerogel | Octadecyltrimethoxysilane | 100 | 380 | 60 |
| Example D11 | Silica-titania composite aerogel | Phenyltrimethoxysilane | 100 | 380 | 60 |
| Example D12 | Silica-titania composite aerogel | n-Octyldimethylchlorosilane | 100 | 380 | 60 |
| Example D13 | Silica-titania composite aerogel | Hexamethyldisilazane | 120 | 380 | 60 |
| Example D14 | Silica-titania composite aerogel | Isopropyl triisostearoyl titanate | 100 | 380 | 60 |
| Example D15 | Silica-titania composite aerogel | Acetoalkoxy aluminum diisopropylate | 100 | 380 | 60 |

| | UV-Vis properties | | | | | |
|---|---|---|---|---|---|---|
| | Absorbance at 450 nm | Absorbance at 550 nm | Absorbance at 650 nm | Absorbance at 750 nm | Absorbance ratio 650 nm/550 nm | Element ratio of base particles Si/Ti |
| Example D1 | 0.32 | 0.19 | 0.09 | 0.03 | 0.47 | 3.1 |
| C. E. D1 | 0.00 | 0.00 | 0.00 | 0.00 | 0.00 | 3.1 |
| C. E. D2 | 0.02 | 0.01 | 0.00 | 0.00 | 0.00 | 3.1 |
| C. E. D3 | 0.00 | 0.00 | 0.00 | 0.00 | 0.00 | 3.1 |
| C. E. D4 | 0.02 | 0.01 | 0.00 | 0.00 | 0.00 | 3.1 |
| C. E. D5 | 0.02 | 0.01 | 0.00 | 0.00 | 0.00 | 3.1 |
| Example D2 | 0.15 | 0.08 | 0.04 | 0.02 | 0.50 | 3.1 |
| Example D3 | 0.18 | 0.10 | 0.04 | 0.03 | 0.40 | 3.1 |
| Example D4 | 0.11 | 0.07 | 0.03 | 0.02 | 0.43 | 3.1 |
| Example D5 | 0.36 | 0.22 | 0.08 | 0.03 | 0.36 | 3.1 |
| Example D6 | 0.26 | 0.13 | 0.05 | 0.02 | 0.38 | 3.1 |
| Example D7 | 0.15 | 0.09 | 0.03 | 0.02 | 0.33 | 3.1 |
| Example D8 | 0.33 | 0.20 | 0.08 | 0.03 | 0.40 | 3.0 |
| Example D9 | 0.29 | 0.18 | 0.07 | 0.03 | 0.39 | 3.1 |
| Example D10 | 0.31 | 0.19 | 0.07 | 0.03 | 0.37 | 3.0 |
| Example D11 | 0.22 | 0.09 | 0.05 | 0.02 | 0.56 | 3.0 |
| Example D12 | 0.19 | 0.08 | 0.04 | 0.02 | 0.50 | 3.0 |
| Example D13 | 0.15 | 0.06 | 0.03 | 0.02 | 0.50 | 3.1 |
| Example D14 | 0.21 | 0.09 | 0.03 | 0.03 | 0.33 | 3.1 |
| Example D15 | 0.19 | 0.08 | 0.04 | 0.02 | 0.50 | 3.1 |

| | BET surface area [m2/g] | Size of particles included in plant protection agent | | Evaluation of performance of plant protection agent | | |
|---|---|---|---|---|---|---|
| | | | | Reduction in plant diseases | | |
| | | Da [μm] | Dp [nm] | Black spot disease | Powdery mildew | Damage to plants |
| Example D1 | 610 | 9.5 | 23 | A | A | A |
| C. E. D1 | 620 | 7.0 | 22 | E | E | A |
| C. E. D2 | 635 | 8.0 | 21 | E | E | A |
| C. E. D3 | 580 | 9.0 | 23 | E | E | A |
| C. E. D4 | 600 | 8.5 | 22 | E | E | A |
| C. E. D5 | 625 | 9.0 | 23 | D | E | A |
| Example D2 | 605 | 9.5 | 23 | B | B | A |
| Example D3 | 590 | 8.5 | 21 | B | C | B |
| Example D4 | 590 | 7.5 | 24 | C | C | A |
| Example D5 | 585 | 10.0 | 23 | A | A | C |
| Example D6 | 590 | 8.0 | 23 | B | A | A |
| Example D7 | 595 | 9.0 | 21 | C | C | A |
| Example D8 | 605 | 9.5 | 22 | A | A | A |
| Example D9 | 605 | 8.0 | 23 | A | A | A |
| Example D10 | 610 | 10.0 | 21 | A | A | A |
| Example D11 | 605 | 9.0 | 23 | B | A | A |
| Example D12 | 595 | 8.0 | 20 | B | B | B |
| Example D13 | 590 | 7.5 | 21 | C | B | A |
| Example D14 | 595 | 9.0 | 24 | B | B | C |
| Example D15 | 600 | 9.5 | 23 | B | C | B |

TABLE 6

| | Titanium oxide compound-containing particles | Surface treatment Organometallic compound | | Heat treatment | |
|---|---|---|---|---|---|
| | | Type | Amount [part] | Temperature [° C.] | Time [minute] |
| Example E1 | Silica-titania composite aerogel | Isobutyltrimethoxysilane | 100 | 380 | 60 |
| C. E. E1 | Silica-titania composite aerogel | — | — | — | — |
| C. E. E2 | Silica-titania composite aerogel | — | — | 380 | 60 |
| C. E. E3 | Silica-titania composite aerogel | Isobutyltrimethoxysilane | 100 | — | — |
| C. E. E4 | Silica-titania composite aerogel | Isobutyltrimethoxysilane | 100 | 110 | 60 |
| C. E. E5 | Silica-titania composite aerogel | Isobutyltrimethoxysilane | 100 | 580 | 80 |
| Example E2 | Silica-titania composite aerogel | Isobutyltrimethoxysilane | 100 | 500 | 60 |
| Example E3 | Silica-titania composite aerogel | Isobutyltrimethoxysilane | 100 | 280 | 60 |
| Example E4 | Silica-titania composite aerogel | Isobutyltrimethoxysilane | 100 | 180 | 120 |
| Example E5 | Silica-titania composite aerogel | Isobutyltrimethoxysilane | 120 | 380 | 60 |
| Example E6 | Silica-titania composite aerogel | Isobutyltrimethoxysilane | 80 | 380 | 60 |
| Example E7 | Silica-titania composite aerogel | Methyltrimethoxysilane | 90 | 380 | 60 |
| Example E8 | Silica-titania composite aerogel | Hexyltrimethoxysilane | 100 | 380 | 60 |
| Example E9 | Silica-titania composite aerogel | Decyltrimethoxysilane | 100 | 380 | 60 |
| Example E10 | Silica-titania composite aerogel | Octadecyltrimethoxysilane | 100 | 380 | 60 |
| Example E11 | Silica-titania composite aerogel | Phenyltrimethoxysilane | 100 | 380 | 60 |
| Example E12 | Silica-titania composite aerogel | n-Octyldimethylchlorosilane | 100 | 380 | 60 |
| Example E13 | Silica-titania composite aerogel | Hexamethyldisilazane | 120 | 380 | 60 |
| Example E14 | Silica-titania composite aerogel | Isopropyl triisostearoyl titanate | 100 | 380 | 60 |
| Example E15 | Silica-titania composite aerogel | Acetoalkoxy aluminum diisopropylate | 100 | 380 | 60 |

| | UV-Vis properties | | | | | Element ratio of base particles Si/Ti |
|---|---|---|---|---|---|---|
| | Absorbance at 450 nm | Absorbance at 550 nm | Absorbance at 650 nm | Absorbance at 750 nm | Absorbance ratio 650 nm/550 nm | |
| Example E1 | 0.34 | 0.19 | 0.06 | 0.04 | 0.32 | 3.0 |
| C. E. E1 | 0.00 | 0.00 | 0.00 | 0.00 | 0.00 | 3.0 |
| C. E. E2 | 0.02 | 0.01 | 0.00 | 0.00 | 0.00 | 3.0 |
| C. E. E3 | 0.00 | 0.00 | 0.00 | 0.00 | 0.00 | 3.0 |
| C. E. E4 | 0.01 | 0.01 | 0.00 | 0.00 | 0.00 | 3.0 |
| C. E. E5 | 0.02 | 0.01 | 0.00 | 0.00 | 0.00 | 3.0 |
| Example E2 | 0.16 | 0.08 | 0.04 | 0.02 | 0.50 | 3.0 |
| Example E3 | 0.11 | 0.07 | 0.03 | 0.02 | 0.43 | 3.0 |
| Example E4 | 0.09 | 0.05 | 0.02 | 0.02 | 0.40 | 3.0 |
| Example E5 | 0.32 | 0.18 | 0.07 | 0.04 | 0.39 | 3.0 |
| Example E6 | 0.30 | 0.16 | 0.06 | 0.04 | 0.38 | 3.0 |
| Example E7 | 0.33 | 0.19 | 0.09 | 0.03 | 0.47 | 3.0 |
| Example E8 | 0.35 | 0.21 | 0.08 | 0.04 | 0.38 | 3.1 |
| Example E9 | 0.29 | 0.18 | 0.07 | 0.03 | 0.39 | 3.0 |
| Example E10 | 0.32 | 0.19 | 0.08 | 0.03 | 0.42 | 3.1 |
| Example E11 | 0.20 | 0.11 | 0.06 | 0.03 | 0.55 | 3.0 |
| Example E12 | 0.15 | 0.08 | 0.03 | 0.02 | 0.38 | 3.0 |
| Example E13 | 0.09 | 0.06 | 0.03 | 0.02 | 0.50 | 3.0 |
| Example E14 | 0.16 | 0.11 | 0.03 | 0.02 | 0.27 | 3.0 |
| Example E15 | 0.19 | 0.10 | 0.04 | 0.02 | 0.40 | 3.1 |

| | Size of particles included in plant protection agent | | | Evaluation of performance of plant protection agent Reduction in plant diseases | | |
|---|---|---|---|---|---|---|
| | BET surface area [m2/g] | Da [μm] | Dp [nm] | Black spot disease | Powdery mildew | Damage to plants |
| Example E1 | 550 | 9.5 | 23 | A | A | A |
| C. E. E1 | 585 | 7.0 | 22 | E | E | A |
| C. E. E2 | 570 | 7.5 | 19 | E | E | A |
| C. E. E3 | 540 | 9.0 | 18 | E | E | A |
| C. E. E4 | 545 | 9.5 | 21 | E | E | A |
| C. E. E5 | 580 | 7.0 | 22 | E | E | A |
| Example E2 | 560 | 8.0 | 21 | C | B | A |
| Example E3 | 540 | 9.0 | 19 | B | C | B |
| Example E4 | 545 | 9.5 | 23 | C | C | A |
| Example E5 | 550 | 7.0 | 22 | A | A | C |
| Example E6 | 530 | 8.0 | 21 | A | A | A |
| Example E7 | 595 | 9.0 | 20 | A | A | A |
| Example E8 | 535 | 8.5 | 22 | A | A | A |
| Example E9 | 555 | 9.0 | 23 | A | A | A |

TABLE 6-continued

| | | | | | | |
|---|---|---|---|---|---|---|
| Example E10 | 520 | 9.5 | 23 | A | A | A |
| Example E11 | 530 | 8.5 | 21 | B | B | A |
| Example E12 | 515 | 7.5 | 24 | B | B | A |
| Example E13 | 500 | 10.0 | 23 | C | C | A |
| Example E14 | 520 | 11.0 | 22 | C | B | B |
| Example E15 | 515 | 9.0 | 21 | C | C | B |

Chlorophyll has an absorption peak at a wavelength of around 450 nm. Although the photocatalyst particles included in the plant protection agents prepared in Examples above have relatively high absorption at a wavelength of 450 nm in the visible region, spraying the plant protection agents prepared in Examples above to roses does not inhibit the growth of the roses. The plant protection agents prepared in Examples above reduce diseases of the roses without inhibiting the growth of the roses.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A plant protection agent comprising:
a photocatalyst particle containing a titanium oxide compound-containing particle; and
an aqueous medium,
wherein a surface of the titanium oxide compound-containing particle is modified by bonding to an organometallic metal compound with a covalent bond, and the organometallic metal compound comprises a metal atom and a hydrocarbon group,
wherein the metal atom is one selected from the group consisting of a silicon atom, an aluminum atom, and a titanium atom, and
the hydrocarbon group is a saturated or unsaturated aliphatic hydrocarbon group having 1 to 20 carbon atoms or an aromatic hydrocarbon group having 6 to 20 carbon atoms,
wherein the photocatalyst particle has absorption at a wavelength of 550 nm,
wherein a ratio of an amount of the aqueous medium to an amount of the photocatalyst particle is 100:0.01 to 100:1 by mass.

2. The plant protection agent according to claim 1, wherein the photocatalyst particles have a volume-average size of 0.5 to 50 μm.

3. The plant protection agent according to claim 1, wherein the photocatalyst particle is formed by aggregation of primary particles, and
wherein the primary particles have an average size of 1 to 200 nm.

4. The plant protection agent according to claim 1, wherein the photocatalyst particles containing the titanium oxide compound is one selected from the group consisting of titanium dioxide particles, metatitanic acid particles, titanium dioxide aerogel particles, and silica-titania composite aerogel particles.

5. The plant protection agent according to claim 1, wherein the metal atom is a silicon atom.

6. The plant protection agent according to claim 1, wherein the hydrocarbon group is a saturated or unsaturated aliphatic hydrocarbon group having 4 to 18 carbon atoms or an aromatic hydrocarbon group having 6 to 20 carbon atoms.

7. The plant protection agent according to claim 1, wherein the metal compound is a metal compound including a metal atom and a hydrocarbon group directly bonded to the metal atom.

8. The plant protection agent according to claim 1, wherein the aqueous medium includes water and a water-soluble organic solvent.

* * * * *